(12) United States Patent
Knuffman et al.

(10) Patent No.: US 10,825,097 B1
(45) Date of Patent: Nov. 3, 2020

(54) SYSTEMS AND METHODS FOR UTILIZING MACHINE-ASSISTED VEHICLE INSPECTION TO IDENTIFY INSURANCE BUILDUP OR FRAUD

(71) Applicant: STATE FARM MUTUAL AUTOMOBILE INSURANCE COMPANY, Bloomington, IL (US)

(72) Inventors: Ryan Knuffman, Danvers, IL (US); Bradley A. Sliz, Normal, IL (US); Lucas Allen, East Peoria, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 311 days.

(21) Appl. No.: 15/843,761

(22) Filed: Dec. 15, 2017

Related U.S. Application Data

(60) Provisional application No. 62/438,769, filed on Dec. 23, 2016.

(51) Int. Cl.
| | |
|---|---|
| *G06T 7/00* | (2017.01) |
| *G06Q 40/08* | (2012.01) |
| *G06Q 10/00* | (2012.01) |
| *G07C 5/00* | (2006.01) |
| *G06Q 30/02* | (2012.01) |

(Continued)

(52) U.S. Cl.
CPC ........... *G06Q 40/08* (2013.01); *B64C 39/024* (2013.01); *G05D 1/0038* (2013.01); *G06Q 10/20* (2013.01); *G06Q 30/0283* (2013.01); *G07C 5/006* (2013.01); *B64C 2201/127* (2013.01); *B64C 2201/141* (2013.01); *B64C 2201/146* (2013.01); *G05D 2201/0207* (2013.01); *G06T 7/0002* (2013.01); *G06T 2207/30248* (2013.01); *G06T 2207/30252* (2013.01); *G06T 2207/30268* (2013.01)

(58) Field of Classification Search
CPC ................... G06Q 10/10; G06Q 10/20; G06T 2207/30248; G06T 2207/30252; G06T 2207/30268
See application file for complete search history.

(56) References Cited

U.S. PATENT DOCUMENTS

| | | |
|---|---|---|
| 8,521,339 B2 | 8/2013 | Gariepy et al. |
| 9,505,494 B1 | 11/2016 | Marlow et al. |

(Continued)

OTHER PUBLICATIONS

Non-Final Office Action, U.S. Appl. No. 15/843,983, dated Apr. 2, 2019.

*Primary Examiner* — Todd Melton
(74) *Attorney, Agent, or Firm* — Marshall, Gerstein & Borun LLP

(57) ABSTRACT

A remotely-controlled (RC) and/or autonomously operated inspection device, such as a ground vehicle or drone, may capture one or more sets of imaging data indicative of at least a portion of an automotive vehicle, such as all or a portion of the undercarriage. The one or more sets of imaging data may be analyzed based upon data indicative of at least one of vehicle damage or a vehicle defect being shown in the one or more sets of imaging data. Based upon the analyzing of the one or more sets of imaging data, damage to the vehicle or a defect of the vehicle may be identified. The identified damage or defect may be compared to a claimed damage or defect to determine whether the claimed damage or defect occurred.

18 Claims, 7 Drawing Sheets

(51) Int. Cl.
    *G05D 1/00*     (2006.01)
    *B64C 39/02*     (2006.01)

(56)     References Cited

U.S. PATENT DOCUMENTS

| | | | |
|---|---|---|---|
| 9,721,302 B2 | 8/2017 | Tofte et al. | |
| 9,855,658 B2 | 1/2018 | Babu | |
| 10,007,992 B1* | 6/2018 | Harvey | G06T 7/0008 |
| 10,102,590 B1 | 10/2018 | Farnsworth et al. | |
| 10,169,856 B1 | 1/2019 | Farnsworth et al. | |
| 10,373,260 B1* | 8/2019 | Haller, Jr. | G06T 5/50 |
| 10,377,485 B2* | 8/2019 | Claybrough | B64F 5/60 |
| 2016/0140778 A1* | 5/2016 | Bailly | G06Q 10/06 |
| | | | 348/148 |
| 2016/0271796 A1 | 9/2016 | Babu | |
| 2017/0148101 A1* | 5/2017 | Franke | G06Q 10/20 |
| 2017/0148102 A1 | 5/2017 | Franke et al. | |
| 2017/0221110 A1 | 8/2017 | Sullivan et al. | |
| 2017/0293894 A1* | 10/2017 | Taliwal | G06T 7/0004 |
| 2018/0155057 A1 | 6/2018 | Irish | |
| 2018/0260793 A1* | 9/2018 | Li | G06Q 10/20 |
| 2019/0266715 A1* | 8/2019 | Myers | B64C 39/024 |

\* cited by examiner

SYSTEMS AND METHODS FOR UTILIZING MACHINE-ASSISTED VEHICLE INSPECTION TO IDENTIFY INSURANCE BUILDUP OR FRAUD

CROSS REFERENCE TO RELATED APPLICATIONS

This application claims priority to and the benefit of the filing date of provisional U.S. Application Ser. No. 62/438,769, filed Dec. 23, 2016 and entitled "Systems and Methods for Machine-Assisted Vehicle Inspection," the entire disclosure of which is incorporated herein by reference.

FIELD OF THE INVENTION

The present disclosure generally relates to machine-assisted vehicle inspection. More particularly, the present disclosure relates to identifying damages to or defects of vehicles via a computerized analysis of one or sets of imaging data captured by a remotely-controlled and/or autonomously operated vehicle, drone, or other inspection device.

BACKGROUND

Conventionally, inspection of a vehicle for damages and/or defects involves manual processes. A mechanic, for example, the mechanic may inspect the body and/or undercarriage of the vehicle. By inspecting the vehicle, the mechanic may identify, for example, aesthetic or functional damages to the vehicle, parts in need of replacement/repair, vehicle alignment issues, and/or other damage to the vehicle or defects of the vehicle. After identifying damage and/or a defect, the mechanic may determine remedial steps to correct the damage or defect (e.g., correction of wheel alignment, repair of a vehicle part, ordering a replacement vehicle part, etc.).

These manual processes, however, may incur high equipment and labor costs. For example, any inspection of a vehicle may require a mechanic to move the vehicle from its current location (e.g., a parking lot) to a more appropriate location (e.g., a repair bay of an automotive repair shop) that offers more physical space and equipment for vehicle inspection. As another example, a complete and accurate inspection of the vehicle undercarriage may require a means for elevating the vehicle (e.g., a vehicle lift). Furthermore, the costs of any vehicle inspection processes are, naturally, subject to labor costs associated with the mechanics or technicians performing the processes.

After inspecting the vehicle, a mechanic may estimate a cost or parts necessary for a service or repair. Alternatively, the mechanic may manually input results of the inspection into a tool to do the same. However, if the mechanic has misidentified or failed to identify a damage or defect of the vehicle, the mechanic or the tool may provide an inaccurate estimate.

SUMMARY

The present aspects may be generally related to utilization of remotely-controlled (RC) and/or autonomously operated inspection devices (e.g., RC or autonomously operated cars or drones to identify damage to a vehicle and/or a defect of the vehicle. The inspection device may capture one or more sets of imaging data indicative of at least a portion of the vehicle. The one or more sets of imaging data may be analyzed based upon data indicative of vehicle damage and/or a vehicle defect. Based upon the analysis of the one or more sets of imaging data, at least one of damage to the vehicle or a defect of the vehicle may be identified.

According to one aspect, a computer system configured to identify at least one of damage to a vehicle or a defect of the vehicle may be provided. The computer system may include (1) one or more processors; and (2) one or more memories storing computer-executable instructions that, when executed by the one or more processors, cause the computer system to (i) cause, via at least one of the one or more processors or one or more transceivers, one or more sets of imaging data indicative of at least a portion of the vehicle (such as all, or a portion of, the undercarriage, including axles, body, wheels, brake lines, exhaust system, etc.) to be captured by an imaging unit of an inspection device, wherein the inspection device is at least one of autonomously operated or remotely-controlled; (ii) receive, via at least one of the one or more processors or the one or more transceivers, the one or more sets of imaging data indicative of the at least the portion of the vehicle captured by the imaging unit of the inspection device (such as via wireless communication or data transmission over one or more radio frequency links or digital communication channels); (iii) analyze, via the one or more processors, the one or more sets of imaging data based upon data indicative of at least one of vehicle damage (e.g., damage to the undercarriage, drivetrain, wheel alignment, axle, wheels, brake lines, exhaust system, etc.) or a vehicle defect being indicated by the one or more sets of imaging data; and/or (iv) identify, via the one or more processors, the at least one of the damage to the vehicle or the defect of the vehicle based upon the analyzing of the one or more sets of imaging data. The computer system may include additional, less, or alternate functionality and components, including those discussed elsewhere herein.

According to another aspect, a computer-implemented method for identifying at least one of damage to a vehicle or a defect of the vehicle may be provided. The method may include (1) causing, via at least one of one or more processors or one or more transceivers, one or more sets of imaging data indicative of at least a portion of the vehicle to be captured by an imaging unit of an inspection device, wherein the inspection device is at least one of autonomously operated or remotely-controlled; (2) receiving, via at least one of the one or more processors or the one or more transceivers, the one or more sets of imaging data indicative of the at least the portion of the vehicle (e.g., all or a portion of the undercarriage, including axles, body, wheels, brake lines, exhaust system, etc.) captured by the imaging unit of the inspection device (such as via wireless communication or data transmission over one or more radio frequency links or digital communication channels); (3) analyzing, via the one or more processors, the one or more sets of imaging data based upon data indicative of at least one of vehicle damage (e.g., damage to the undercarriage, wheel alignment, drivetrain, axle, wheels, brake lines, exhaust system, etc.) or a vehicle defect being indicated by the one or more sets of imaging data; and/or (4) identifying, via the one or more processors, the at least one of the damage to the vehicle or the defect of the vehicle based upon the analyzing of the one or more sets of imaging data. The method may include additional, less, or alternate actions, including those discussed elsewhere herein. The method may be implemented via computer-executable instructions stored on non-transitory computer-readable media or medium.

According to another aspect, a computer-implemented method for verifying a claim may be provided. The method may include (1) receiving, via at least one of one or more processors or one or more transceivers, an indication of a claim associated with a reported at least one of a damage to a vehicle or a defect of the vehicle (such as via wireless communication or data transmission over one or more radio frequency links or digital communication channels); (2) receiving, via at least one of the one or more processors or one or more transceivers (such as via wireless communication or data transmission over one or more radio frequency links or digital communication channels), one or more sets of imaging data captured by an imaging unit of an inspection device that is at least one of autonomously operated or remotely-controlled, the one or more sets of imaging data being indicative of at least a portion of the vehicle (such as all or a portion of the undercarriage, including axles, body, wheels, brake lines, exhaust system, etc.); (3) analyzing, via the one or more processors, the one or more sets of imaging data to identify at least one of damage to the vehicle (e.g., damage to the undercarriage, wheel alignment, drivetrain, axle, wheels, brake lines, exhaust system, etc.) or a defect of the vehicle; (4) analyzing, via the one or more processors, the identified at least one of the damage to the vehicle or the defect of the vehicle with respect to the reported damage to determine whether the damage to the vehicle has occurred or the reported defect of the vehicle is present, and/or (5) processing, via the one or more processors, the claim when it is determined that the reported damage to the vehicle has occurred or that the reported defect of the vehicle is present. The method may include additional, less, or alternate actions, including those discussed elsewhere herein. The method may be implemented via a computer system having processors and/or transceivers, and/or implemented via computer-executable instructions stored on non-transitory computer-readable media or medium.

According to another aspect, a computer-implemented method for identifying at least one of damage to a current vehicle or a defect of the current vehicle damage based upon training sets of imaging data indicative of reference vehicles may be provided. The method may include (1) training one or more processing elements to identify at least one of vehicle damages or vehicle defects based upon the training sets of imaging data, the training sets of imaging data being indicative of, for each of the reference vehicles, at least a portion of the reference vehicle; (2) receiving, via a communication element, one or more current sets captured by an imaging unit of an inspection device that is at least one of autonomously operated or remotely-controlled, each the one or more current sets of imaging being indicative of at least a portion of the current vehicle (such as via wireless communication or data transmission over one or more radio frequency links or digital communication channels); and/or (3) analyzing, via the one or more trained processing elements, the one or more current sets of imaging data to identify the at least one of the damage to the current vehicle or the defect of the current vehicle. The method may include additional, less, or alternate actions, including those discussed elsewhere herein. The method may be implemented via a computer system having processors and/or transceivers, and/or implemented via computer-executable instructions stored on non-transitory computer-readable media or medium.

BRIEF DESCRIPTION OF THE DRAWINGS

Advantages will become more apparent to those skilled in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an aspect of a particular aspect of the disclosed applications, systems and methods, and that each of the figures is intended to accord with a possible aspect thereof. Furthermore, wherever possible, the following description refers to the reference numerals included in the following figures, in which features depicted in multiple figures are designated with consistent reference numerals.

DETAILED DESCRIPTION

Figure 1A:
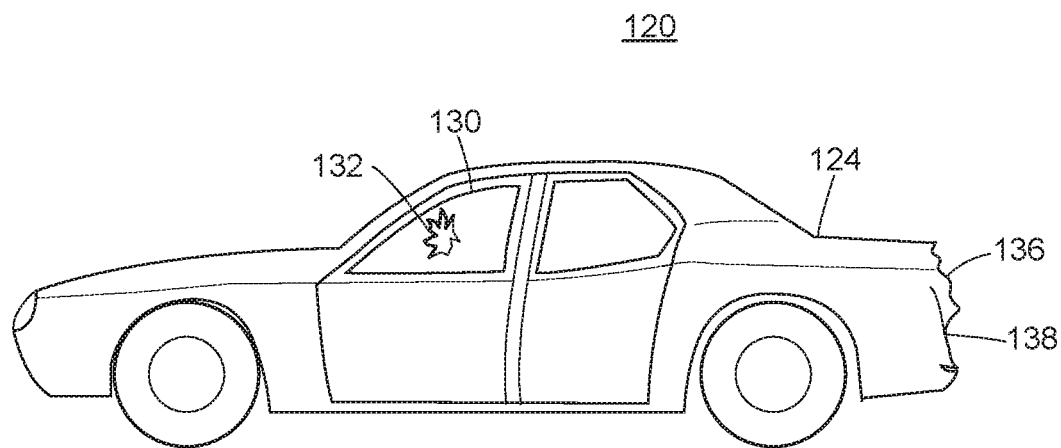
FIGS. 1a-1b illustrate profile and undercarriage views of a damaged and/or defective vehicle in accordance with exemplary aspects of the present disclosure.

Referring to FIG. 1a, a profile view 120 of an example automotive vehicle 124 is shown. The automotive vehicle 124 (e.g., a car, truck, or motorcycle) may experience damage or acquire a defect over the course of normal operation, or as a result of a particular event (e.g., a single or multi-car collision, inclement weather, vandalism, etc.). Damage to the vehicle 124 may include, for example, a window 130 sustaining a crack or break 132, and/or a rear bumper 136 sustaining a dent 138, as is illustrated in FIG. 1a. Various other damage to the vehicle or defects of the vehicle (e.g., a broken or defective headlight/taillight, a dented door, a flat tire, a cracked windshield, etc.) is possible.

Figure 1B:
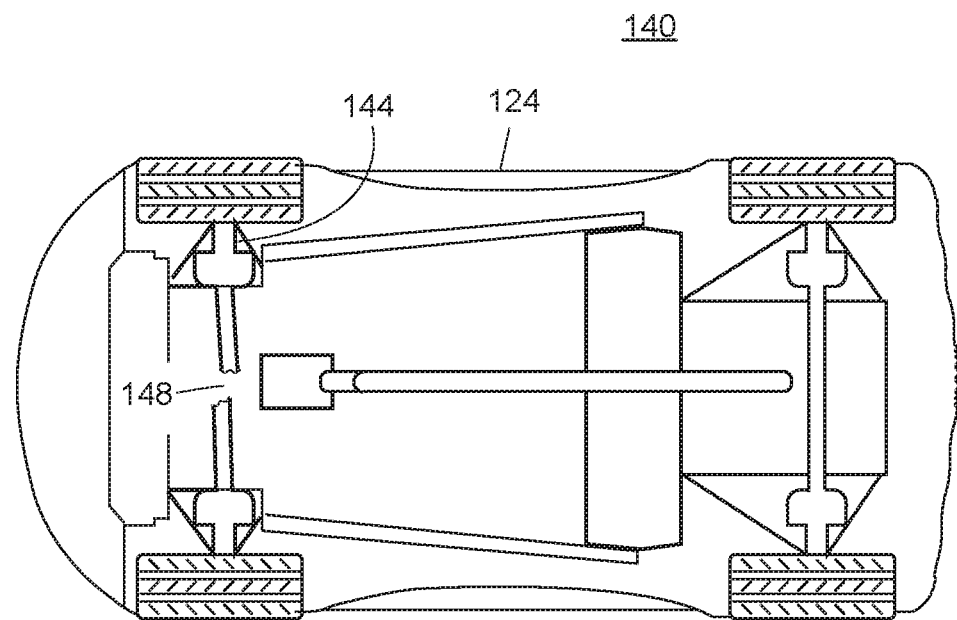

Referring now to FIG. 1b, the vehicle 124, when viewed from an undercarriage (i.e., from beneath) view 140, may exhibit damage to its undercarriage or a defect of the undercarriage. For example, damage to the vehicle 124 may include the axle 144 having a break 148, as is shown in FIG. 1b. Various other undercarriage damages or defects (e.g., a poor wheel alignment, a pierced and/or dented undercarriage part, etc.), are possible.

Conventionally, the inspection of a vehicle (e.g., the vehicle 124) for such damages and defects is a manual process. A mechanic, for example, may visually inspect the body and/or undercarriage of the vehicle 124 from views similar to the profile view 120 and the undercarriage view 140, respectively, to identify damage to and/or one or more defects of the vehicle 124.

After identifying damage to the vehicle 124 or a defect of the vehicle 124, the mechanic may recommend a service or repair (e.g., alignment correction, part replacement, or part repair) that may remedy the one or more damages and/or defects. Additionally or alternatively, the mechanic may manually input his or her observations into a computer program that will similarly provide output of a recommended service or repair. Recommendation of a service or repair may include an estimated cost and/or an estimated time frame for completion of the service or repair.

Figure 2:
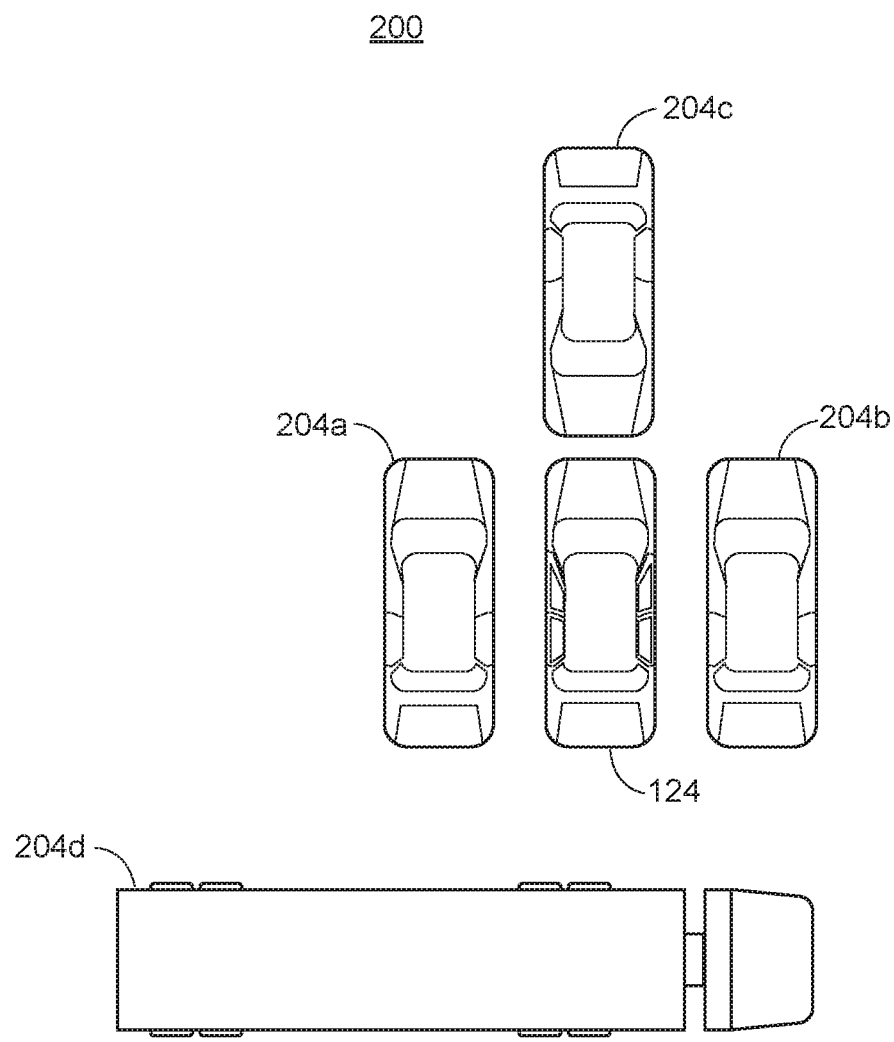
FIG. 2 illustrates a damaged and/or defective situated in a parking lot in accordance with an exemplary aspect of the present disclosure.

These manual inspection processes, however, have notable disadvantages and limitations. One disadvantage in particular is evident from FIG. 2, which depicts the vehicle 124 situated in a parking lot 200 and surrounded by other vehicles 204a-204d. In practice, it is common for a damaged vehicle to be stored in a parking lot or another crowded area until it can be manually inspected. Conventionally, before the vehicle 124 can be inspected, the vehicle 124 must be moved from the parking lot 200 into a repair bay of a repair shop, for example, or at least to an area of space open enough for the mechanic to comfortably inspect the vehicle from the necessary views.

Further, inspection of the undercarriage of the vehicle 124 may require use of specialized machinery (e.g., a vehicle lift for elevating the vehicle 124) such that the vehicle 124 may be viewed from below (i.e., the undercarriage view 140). Thus, inspection of the undercarriage of the vehicle 124 may require that the vehicle 124 be moved into a repair bay where the specialized machinery is located. In effect, if the vehicle 124 is not geographically located near a shop with such machinery, it may be exceedingly difficult or even impossible for a mechanic to manually inspect the undercarriage of the vehicle 124 without driving or transporting the vehicle 124 a significant distance.

Accordingly, manual inspection of the vehicle 124 may introduce significant costs and delays. Cost of inspection equipment, time spent moving and manually inspecting the vehicle, and cost of a mechanic's labor may significantly increase the cost of a vehicle diagnosis, service, and/or repair.

The systems and methods described herein address at least these deficiencies in the field of automotive vehicle inspection. Using the systems and methods described herein, damages to vehicles and defects of vehicles may be identified and remedied more quickly and easily. Utilizing an imaging-enabled inspection device (e.g., a remotely-controlled and/or autonomously operated airborne or ground inspection device), one or more sets of imaging data (also referred to as "images") of a vehicle (e.g., the vehicle 124) may be captured and automatically analyzed to identify one or more damages or defects of the vehicle 124.

Generally, the small size and high maneuverability of the inspection device may allow the inspection device to easily move above the vehicle 124, below the vehicle 124, and/or between the vehicle 124 and another object (e.g., the vehicle 204a and/or another nearby vehicle(s) or object(s)), without requiring the vehicle 124 to be repositioned or hoisted by a vehicle lift. Further, the inspection device may even be transported to a current location of the vehicle (e.g., by a mechanic or an insurance estimator), and thus the vehicle may not need to be transported to a particular location (e.g., a repair bay of a repair shop) for inspection.

Accordingly, among other advantages and improvements, the present aspects improve an existing technological process in the field of automotive vehicle inspection. For instance, the present aspects more particularly improve the technological process of inspecting a vehicle for damage and defects by utilizing an autonomously operated and/or remote-controlled inspection device to capture and analyze images of a vehicle to automatically identify damage to a vehicle or a defect of the vehicle, and thereby provide advantages over conventional inspection techniques such as the advantages described above.

Machine-Assisted Vehicle Inspection System

Figure 3:
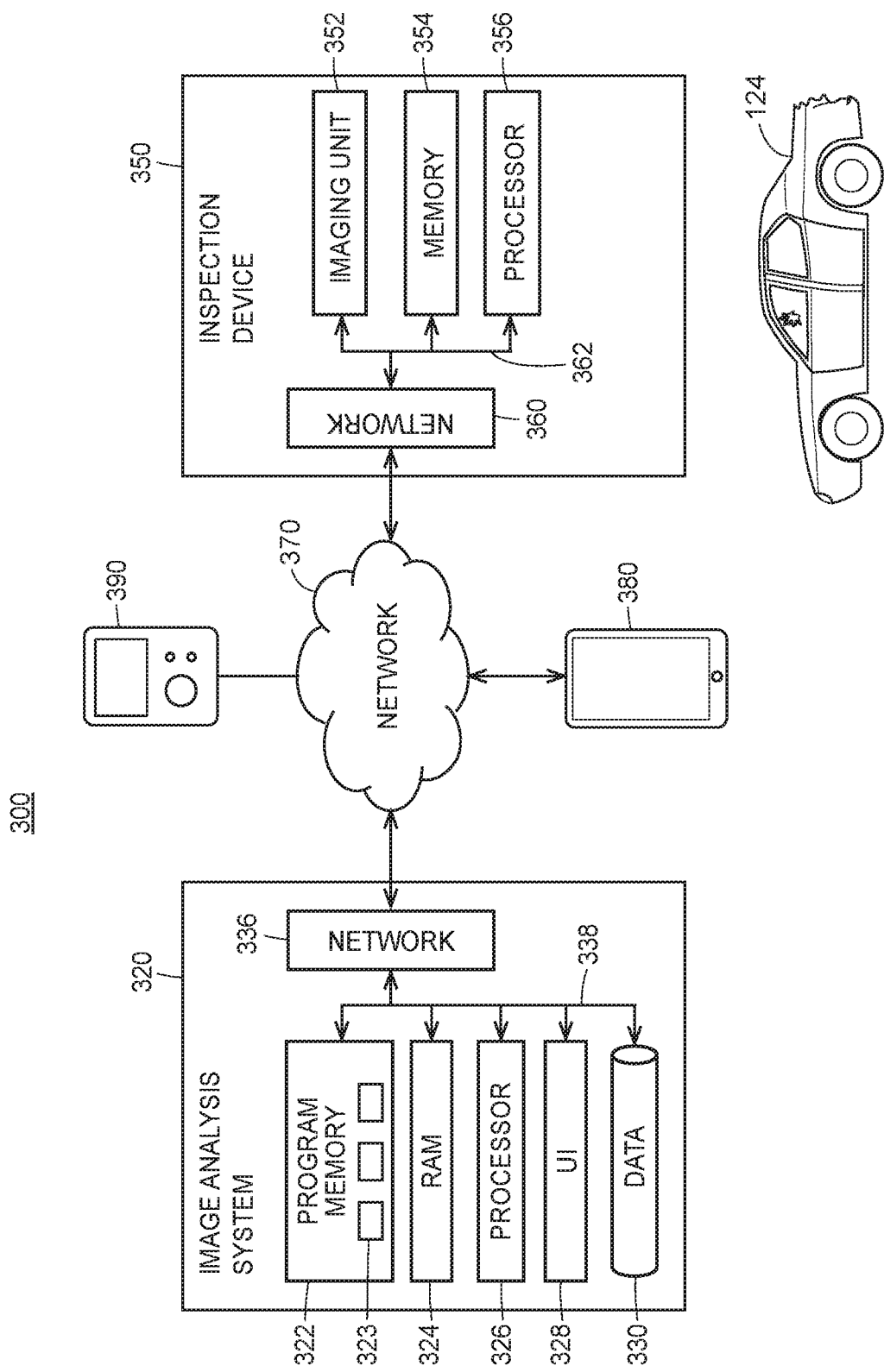
FIG. 3 depicts an exemplary computer system for inspecting a damaged and/or defective vehicle in accordance with an exemplary aspect of the present disclosure.

FIG. 3 depicts an example computer system 300 that may be used to inspect an automotive vehicle (e.g., the vehicle 124) to identify one or more damages or defects of the vehicle 124. The system 300 may include an image analysis system 320, a vehicle inspection device 350, the vehicle 124, a mobile device 380, a controller unit 390, and/or other components, which may communicate over one or more communication networks 370, such as via wireless communication or data transmission over one or more radio frequency links or digital communication channels.

In this detailed description, reference will be made to the vehicle 124 depicted in the drawings, which may be a car. However, it should be understood in light of the teaching and disclosure herein that the vehicle 124 may be, for example, a truck, a motorcycle, a bus, or any other suitable automotive vehicle.

The inspection device 350 may be used to inspect the vehicle 124. Generally, the inspection device 350 may be any imaging-enabled device that may move around, over, and/or below the vehicle 124 to capture one or more images of at least a portion of the vehicle 124 (e.g., a face of the vehicle 124, a specific part, a number of parts of a specific type, etc.).

For example, in some aspects, the inspection device 350 may be a remotely-controlled (RC) and/or autonomously operated ground inspection device (e.g., an RC car). A computer program or a human operator, for example, may direct the inspection device 350 to circle about the vehicle 124 on the ground to capture one or more images of the front, rear, and/or sides of the vehicle 124. Alternatively or additionally, if the inspection device is short enough in height, the program or operator may control the inspection device to position itself underneath the vehicle 124 to capture one or more images of the undercarriage (e.g., the chassis, which may include the engine, axles, transmission, suspension, and/or exhaust, among other parts) of the vehicle 124. Further, if the inspection device is taller in height (or if height is adjustable) the inspection device may also or alternatively be elevated to capture one or more images of the top (e.g., hood, windshield, and/or roof) of the vehicle 124.

In some aspects, the inspection device 350 may be a remotely-controlled and/or autonomously operated airborne inspection device (e.g., a drone or nano drone). A computer program or a human operator, for example, may direct the inspection device 350 to fly over and/or around the vehicle 124 to capture one or more images of at least a portion of the vehicle 124 (e.g., the front, rear, sides, and/or top), such as via wireless communication or data transmission over one or more radio frequency links or digital communication channels.

In any case, the inspection device 350 may include an imaging unit 352 (e.g., a camera). The imaging unit 352 may be temporarily affixed (e.g., within a device holder) or included permanently as a part of the inspection device 350 in any suitable configuration (e.g., situated on top of the inspection device 350, hanging from the bottom of the inspection device 350, etc.) such that the inspection device 350 may capture one or more images of the vehicle 124. The imaging unit 352 may be for example, a still image or video camera device, a lidar (laser remote sensing) device, a radar device, a sonar device, a thermal imaging device, or some combination of the above (e.g., a video camera device additionally including lidar and thermal imaging capabilities). Accordingly, the imaging unit 352 may be configured to capture any one or more types of images (e.g., analog or digital photographs, thermal images, lidar scans, radar images, sonar images, etc.), and the images may include still photographs, video, or some combination of the two. Further, in one aspect, the imaging unit 352 may utilize specialty imaging equipment such as a specialty lens (e.g., a wide-angle "fisheye" lens), as will be discussed herein.

Operation of the inspection device 350 (including movement and/or image capturing) may be controlled in any of a number of suitable manners. In some aspects, a human operator may operate the inspection device via the controller unit 390, which may communicate with the inspection device 350 via the one or more networks 370 (which may be one or more wired and/or wireless networks, public and/or private networks, using any communication standard or technology), such as via wireless communication or data transmission over one or more radio frequency links or digital communication channels. In other aspects, one or more memories 354 of the inspection device 350 may include operation instructions that, when executed on one or more processors 356 of the inspection device 350, may cause the inspection device 350 to inspect the vehicle 124 according to the operation instructions (e.g., by performance of one or more inspection actions such as those described herein). In one aspect, the operation instructions may include static, precise instructions for movement of the inspection device 350 and/or for image capturing using the imaging unit 352 (e.g., to capture the one or more images at a particular time or frequency). Additionally or alternatively, the operation instructions may enable the inspection device 350 to move autonomously (e.g., moving in response to the location of the vehicle 124 and/or nearby obstacles detected via the imaging unit 352) and/or capture the one or more images in response to stimuli or objects detected via the imaging unit 352. Additionally or alternatively, operation instructions may be stored at the image analysis system 320, and the image analysis system 320 may cause, via one or more processors 326 and the one or more networks 370, the imaging unit 352 to capture one or more images of at least a portion of the vehicle 124.

Combinations of two or more of the above-described techniques for operation of the inspection device 350 may be used. For example, movement of the inspection device 350 may proceed according to instructions stored at the one or more memories 354, while image capturing may be controlled by a human operator via the controller unit 390. As another example, operation instructions may be stored at the inspection device 350, but the image analysis system 320 may cause the instructions to be executed at the inspection device 350.

In any case, in operation, the inspection device 350 may capture one or more images of the vehicle 124 via the imaging unit 352. The inspection device 350 may store the one or more images at the one or more memories 354, to which the imaging unit 352 may be communicatively connected via a system bus 362. The inspection device 350 may be configured to store the one or more images at the one or more memories 354 until the one or more images are e manually retrieved by an operator (e.g., by removal of a removable storage by a mechanic or insurance representative). Alternatively or additionally, the inspection device 350 may be configured to automatically transmit the one or more images via a network interface 360 (which may include one or more transceivers) and the one or more networks 370 to the image analysis system 320.

The image analysis system 320 may include one or more memories, which may include one or more program memories 322 storing one or more programs 323, and/or one or more random access memories (RAMs) 324. The one or more programs 323 may include computer-executable instructions that, when executed on the one or more processors 326, cause the image analysis system 320 to perform the operations described herein. Additionally, or alternatively, a user may utilize a user interface (UI) 328 to cause (e.g., via a mouse interaction, a key stroke, voice command, motion gesture, etc.) the image analysis system 320 to perform the operations described herein.

Generally, the image analysis system 320 may be configured to automatically analyze one or more images of the vehicle 124 to identify damage to the vehicle 124 (e.g., body, undercarriage, or other part damage) and/or one or more defects of the vehicle 124 (e.g., a defective part or an improper wheel alignment). The image analysis system 320 may be configured to perform alternative or additional actions, including actions described herein. For example, the image analysis system 320 may cause, via the one or more processors 326 and/or one or more transceivers, one or more images of at least a portion of the vehicle 124 to be captured by the imaging unit 352 of the inspection device 350.

The image analysis system 320 may be configured to receive, via one or more network interfaces 336 and the one or more networks 370, one or more images of the vehicle 124. The one or more images may be received, for example, in the form of analog and/or digital signals transmitted over the one or more networks 370. Alternatively or additionally, the image analysis system 320 may receive at least one of the one or more images via a physical medium. For example, a USB storage device may physically transfer data from the inspection device 350 to the image analysis system 350. In any case, the image analysis system 320 may store the one or more images at a data storage 330 (e.g., one or more memories and/or servers) and/or at the one or more program memories 322.

The image analysis system 320 may employ various image processing techniques, algorithms, calculations, etc. in analyzing the one or more images of the vehicle 124. For example, the image analysis system 320 may utilize pixilation, linear filtering, image editing, image restoration, principal component analysis, independent component analysis, hidden Markov models, anisotropic diffusion, partial differential equations, self-organizing maps, neural networks, wavelets, and/or other techniques, algorithms, and/or calculations.

The image analysis system 320 may analyze, via the one or more processors 326, the one or more images of the vehicle 124 based upon data (e.g., stored at the data storage 330 or in the one or more program memories 322) indicative of at least one of vehicle damage or a vehicle defect being shown in the one or more images. The data indicative of the vehicle damage and/or the vehicle defect being shown in the one or more images may include, for instance, data indicative of one or more image characteristics that correspond to a presence of damage and/or a defect(s); image data representative of other (e.g., previously captured) images showing vehicle damage and/or a vehicle defect(s); and/or any other suitable data. Based upon the analyzing of the one or more images, the image analysis system 320 may identify, via the one or more processors 326, the at least one of the damage to the vehicle 124 or the defect of the vehicle 124.

In some aspects, analyzing the one or more images of the vehicle 124 may include (i) comparing the one or more images of at least a portion of the vehicle 124 to one or more reference images of vehicle damages and/or vehicle defects of one or more reference vehicles, and (ii) determining a similarity between at least one of the one or more images of the vehicle 124 and at least one of the one or more reference images. Identifying the damage to the vehicle 124 and/or the defect of the vehicle 124 may include identifying the damage and/or defect based upon a known damage or known defect of a reference vehicle depicted in at least one of the one or more reference images. For example, the one or more reference images may include an image I known to depict a broken vehicle window, and upon comparing the one or more images of the vehicle 124 to the reference images, similarity may be determined to exist between an image X of the one or more images of the vehicle 124 and the image I. Thus, the vehicle 124 may be identified to have a broken window based upon the similarity and the known damage depicted in the image I.

The system 300 may perform additional or alternative actions, including the actions described herein. For instance, in some aspects, the system 300 may be configured to perform additional actions based upon the identified damage to the vehicle 124 and/or defect of the vehicle 124. These actions may provide benefits including expedited correction of the damage/defect, more reliable correction of the damage/defect, and/or reduced cost of labor, and may be performed, for example, by the image analysis system 320.

In some aspects, the damage and/or defect of the vehicle 124 may include a damaged vehicle part or a defective vehicle part (e.g., a physically damaged or a defective wheel). In these aspects, the system 300 may be configured to cause a maintenance, repair, or part replacement to be scheduled for the damaged or defective vehicle part. Further, the system 300 may be configured to cause a proper replacement part (i.e., the correct part type, size, specification, and/or brand) to be identified. Furthermore, the system 300 may be configured to cause an order for the replacement part to be initiated. For instance, the image analysis system 320 may determine a suitable repair facility based upon the identification of the damaged or defective vehicle part and/or based upon stored data (e.g., in the data storage 330) regarding one or more repair facilities, and may cause a request to be sent via the one or more networks 370 to the determined repair facility to schedule an appointment for the maintenance, repair, or part replacement.

In other aspects, the damage to the vehicle 124 and/or defect of the vehicle 124 may include an improper wheel alignment. In these aspects, the image analysis system 320 may cause a maintenance for correcting the improper wheel alignment to be scheduled. For instance, the image analysis 320 may identify a suitable facility to be identified, and may cause a request to be sent, via the one or more networks 370, to the determined facility to schedule an appointment for the correction of the improper wheel alignment.

In any case, when at least one of damage to the vehicle 124 and/or a defect of the vehicle 124 is identified, the system 300 may be configured to estimate a monetary cost of a maintenance, service, and/or repair for correcting the identified vehicle damage or vehicle defect. Further, the system 300 may be configured to estimate a timeframe for correction of the identified vehicle damage or defect of the vehicle. For instance, the image analysis system 320 may estimate, based upon stored data (e.g., in the data storage 330), a monetary cost based upon a cost of one or more vehicle replacements and/or an estimated cost of repair or service labor. Additionally or alternatively, the image analysis 320 may cause a request to be sent, via the one or more networks 370, to a determined maintenance, service, and/or repair facility, the request inquiring as to a monetary cost of a maintenance, repair, and/or service.

If at least one of a damage to the vehicle 124 and/or a defect of the vehicle 124 is identified, the system 300 may further be configured to transmit, to the mobile device 380 (e.g., a smartphone, pager, PDA, smart wearable device, etc.) of a party associated with the vehicle 124, an indication of the identified at least one of the damage or defect. The party associated with the vehicle 124 may include, for example, an owner of the vehicle 124, a lessee of the vehicle 124, a driver of the vehicle 124, and/or an insurance representative (e.g., an automotive insurance agent, estimator, underwriter, etc.). The indication of the identified damage and/or defect may include at least one of a textual explanation of the identified at least one of the damage and/or defect, one or more images of the identified damage and/or defect, an estimated monetary cost for correcting the identified damage and/or defect, or an estimated time frame for correcting the identified damage and/or defect. The indication may be presented at the mobile device 380 in the form of a text message, a push notification, a web page, a voice message, and/or another suitable mode.

In some aspects, the system 300 may be further configured to generate and/or modify terms of an insurance policy. For example, in some aspects, the system 300 may be configured to generate one or more terms of an insurance policy based upon the identified at least one of the damage to the vehicle 124 or defect of the vehicle 124. Additionally or alternatively, the system 300 may be configured to modify one or more terms of an insurance policy of a party (e.g., an owner or driver) associated with the vehicle. Generated or modified terms of an insurance policy may include a premium, a coverage limit, and/or a deductible, for instance. The insurance policy may be an automotive insurance policy or another type of policy (e.g., home, life, renters, etc.)

Furthermore, in some aspects, the system 300 may be configured to verify a claim (e.g., a vehicle insurance claim). In one aspect, the system 300 may be configured to receive an indication of an insurance claim associated with a reported at least one of a damage to the vehicle 124 or a defect of the vehicle 124. The system 300 may receive the indication, for instance, from an insurance provider and/or from an insured party via the mobile device 380 or via another suitable computing device. The system 300 may further be configured to receive one or more images captured by the imaging unit 352 of the inspection device 350 that is at least one of autonomously operated or remotely-controlled, the one or more images being of at least a portion of the vehicle 124. The system 300 may receive the one or more images, for instance, from an insurance provider and/or from an insured party via the mobile device 380 or via another suitable computing device. The system 300 may further be configured to analyze one or more images to identify at least one of damage to the vehicle 124 or a defect of the vehicle 124, and analyze the identified at least one of the damage to the vehicle 124 or the defect of the vehicle 124 with respect to the reported damage and/or defect to determine whether the damage to the vehicle 124 has occurred or the reported defect of the vehicle 124 is present.

If the system 300 determines that the reported damage to the vehicle 124 has occurred or that the reported defect of the vehicle 124 is present, the system 300 may process the insurance claim (e.g., issue a replacement vehicle and/or a payment to an insured party).

In some aspects, the system 300 may be configured to employ machine or cognitive learning techniques, as will be described herein.

Example System Use Scenarios

Figure 4A:
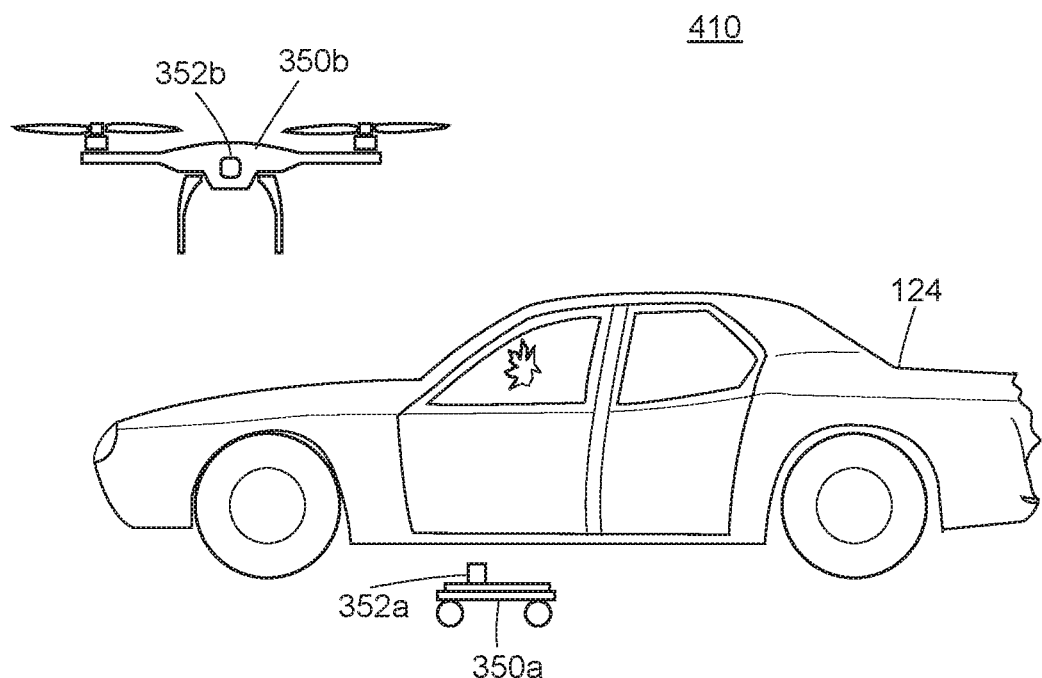
FIGS. 4a-4b depict overhead and profile views of a vehicle inspected by an inspection device in accordance with exemplary aspects of the present disclosure.
Figure 4B:
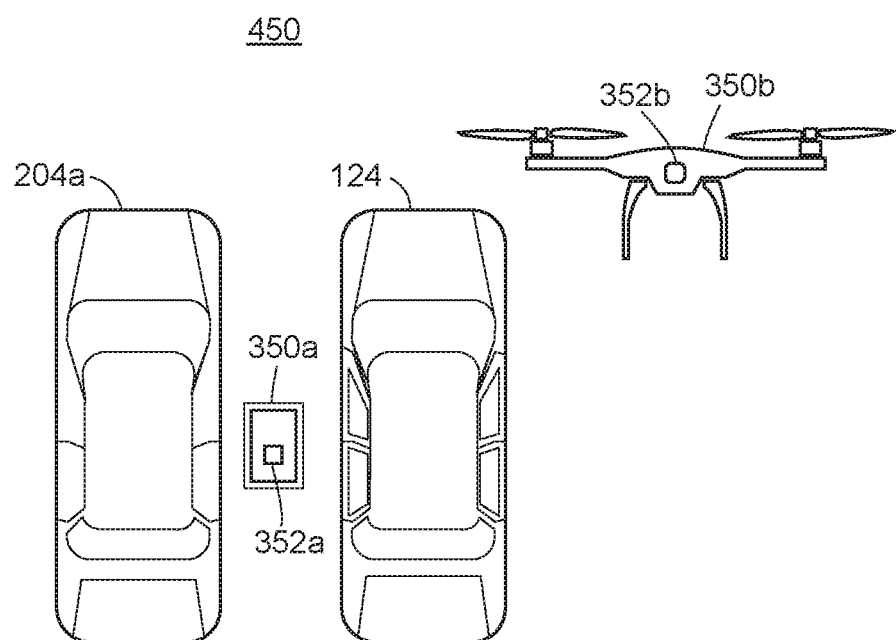

Use of remotely-controlled and/or autonomously operated imaging-enabled inspection devices (e.g., the inspection device 350) may utilize technologies and provide advantages including those advantages that will be evident from the exemplary use scenarios depicted in FIGS. 4a-4b.

FIGS. 4a-4b depict profile and aerial views 410 and 450, respectively, of various elements of the system 300 of FIG. 3. In particular, each of the profile view 410 of FIG. 4a and the aerial view 450 of FIG. 4b depict the vehicle 124 inspected by an exemplary ground inspection device 350a and an example airborne inspection device 350b. It should be appreciated in light of the teaching and disclosure herein that each of the example ground inspection devices 350a and airborne inspection devices 350b may be a suitable implementation of the inspection device 350. In the examples of FIGS. 4a and 4b, each ground inspection device 350a may be a remotely-controlled and/or autonomously operated ground inspection device (e.g., an inspection device situated on the ground but still capable of moving across land, such as an RC car). Each airborne inspection device 350b may be a remotely-controlled and/or autonomously operated airborne inspection device (e.g., situated in the air and capable of sustained flight, such as a drone or nano drone). However, other inspection devices are possible. Further, while two inspection devices 350 are depicted in each of FIGS. 4a and 4b, additional or fewer inspection devices may be used. In other words, in some embodiments, vehicle inspection may be accomplished using a single ground inspection device 350a or a single airborne inspection device 350b. In other embodiments, vehicle inspection may utilize two or more inspection devices 350, which may include a combination of ground inspection devices 350a and airborne inspection devices 350b.

Advantages of the use of the ground inspection device 350a for vehicle inspection will be evident from the profile view 410 of FIG. 4a. For example, if the inspection device 350a is an inspection device of short height, it may be possible for the inspection device 350a to maneuver under the vehicle 124 to capture images of the undercarriage (including wheels, axles, and exhaust pipes, for instance) of the vehicle 124. Thus, utilizing the inspection device 350a, it may not be necessary to move the vehicle 124 (e.g., from a parking spot in which a mechanic is unable to inspect the vehicle 124) and/or employ a vehicle lift to identify a damage to the vehicle 124 or defect of the vehicle 124 present within the vehicle undercarriage.

Still referring to FIG. 4a, inspection of the vehicle 124 may additionally or alternatively utilize the airborne inspection device 350b. The maneuverability of the airborne inspection device 350b (e.g., a drone or nano drone) may allow the inspection device 350b to capture a variety of images of at least portions of the vehicle 124, including the front, sides, rear, and/or roof of the vehicle 124 and the vehicle parts and components included therein.

Referring now to FIG. 4b, an aerial view 450 of the vehicle 124 inspected by the inspection devices 350a and 350b is depicted. It should be appreciated in light of the teaching and disclosure herein that, if the ground inspection device 350a is of sufficiently small size, the ground inspection device 350a may be configured or operated to maneuver between the vehicle 124 and another nearby vehicle 204a (which may be, for example, adjacent to the vehicle 124 in a parking lot) to capture one or more images of at least a portion of the vehicle 124. Additionally or alternatively, the airborne inspection device 350b may capture one or more images of at least a portion of the vehicle 124, with minimal interference from the adjacent vehicle 204a.

Specialty imaging technologies, such as specialty lenses in imaging units 352a and/or 352b of the inspection devices 350a and/or 350b (where the imaging units 352a and/or 352b may be an implementation(s) of the imaging unit 352), respectively, may assist in capturing images of the vehicle 124. For example, in some embodiments, an imaging unit 352 (e.g., the imaging unit 352a, the imaging unit 352b, or another imaging unit) of an inspection device 350 (e.g., the ground inspection device 350a, the airborne inspection device 350b, or another inspection device) may include a wide-angle (e.g., "fisheye") lens. If the inspection device 350 is positioned sufficiently close to the vehicle 124 (e.g., as the ground inspection device 350a is depicted in FIGS. 4a and 4b), a wide-angle lens may allow the imaging unit 352 to capture a greater portion of the vehicle 124 in a particular image. If the inspection device 350 is positioned farther from the vehicle 124, a wide-angle lens may allow the imaging unit 352 to capture an even greater portion of the vehicle 124 in a single image, and may even allow the imaging unit 352 to capture useful portions of multiple vehicles in a single image. For instance, if the vehicle 204a depicted in FIG. 4b also requires inspection, the imaging unit 352 may capture an image of at least a portion of each of the vehicle 124 and the vehicle 204a simultaneously.

In other aspects, the imaging unit 352 of the inspection device 350 may be a 360-degree camera, which may be utilized to capture a greater portion of the vehicle 124 and/or one or more other vehicles in each single image of one or more images captured by the inspection device 350. Still further, in other aspects, the imaging unit 352 of the inspection device 350 may include a zooming lens, the zooming of which may be remotely-controlled and/or autonomously operated.

Still further, in other aspects, the imaging unit 352 of the inspection device 350 may additionally or alternatively include other imaging components and/or utilize other imaging protocols. For instance, various camera lenses (varying in focal length, aperture, etc.) may be utilized in the imaging unit 352.

Figure 5:
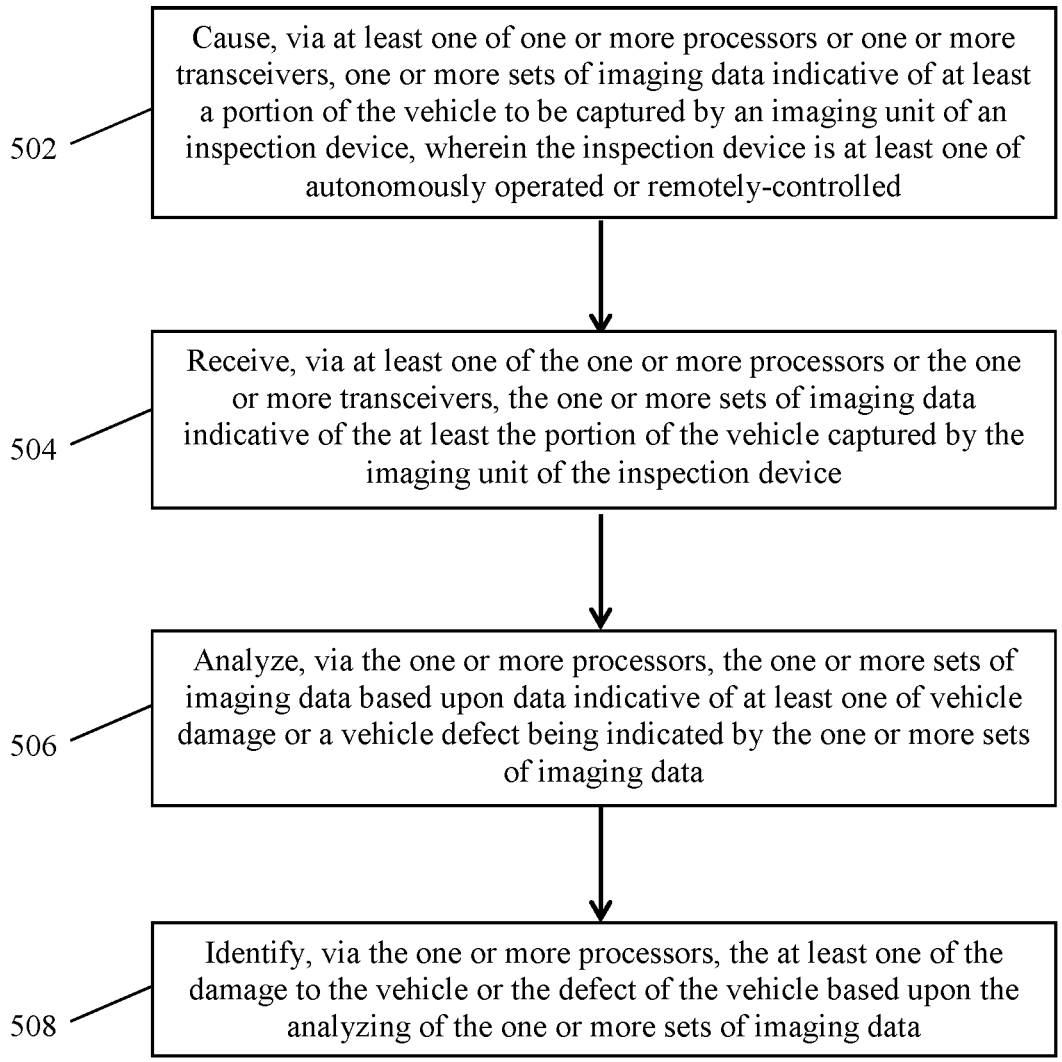
FIG. 5 illustrates a flow diagram of an exemplary computer-implemented method for identifying at least one of damage to a vehicle or a defect of the vehicle in accordance with an exemplary aspect of the present disclosure.

Exemplary Computer-Implemented Method for Identifying Vehicle Damage and/or a Vehicle Defect FIG. 5 illustrates a flow diagram of an exemplary computer-implemented method 500 for identifying at least one or damage to a vehicle (e.g., the vehicle 124) or a defect of the vehicle 124. The method 500 may be implemented by the system 300 depicted in FIG. 3 or another suitable system. The method 500 may include additional, less, or alternate actions, including actions described with regard to the system 300 of FIG. 3 and other actions discussed elsewhere herein.

The method 500 may include causing, via at least one of one or more processors (e.g., the one or more processors 326) or one or more transceivers, one or more sets of imaging data (also referred to herein as "images") indicative of at least a portion of the vehicle to be captured by an imaging unit (e.g., the imaging unit 352) of an inspection device (e.g., the inspection device 350), wherein the inspection device is at least one of autonomously operated or remotely-controlled (block 502). In some aspects, an image analysis system (e.g., the image analysis system 320) may remotely control the inspection device to capture the one or more images of the vehicle. In other aspects, the image analysis system may cause the inspection device to operate autonomously and/or to capture the one or more images under remote control of another device or party.

The inspection device 350 may be, for example, a ground inspection device (e.g., the ground inspection device 350a) that is at least one of autonomously operated or remotely-controlled. Alternatively, the inspection device may be an airborne inspection device (e.g., the airborne inspection device 350b) that is at least one of autonomously operated or remotely-controlled. Further, multiple inspection devices may be utilized to capture the one or more images, and the multiple inspection devices may be a combination of ground and airborne inspection devices.

The imaging unit 352 of the inspection device 350 may include a photographic camera, a video camera, a lidar imaging unit, a thermal imaging unit, a sonar imaging unit, a radar imaging unit, etc. Accordingly, the one or more images captured by the imaging unit 352 of the inspection device 350 may include still photographs, video, or a suitable combination of the two. Further, the one or more images may include photographic images, lidar images, thermal images, radar images, sonar images, or a suitable combination of the above. Further, the imaging unit 352 may utilize specialty lenses such as wide-angle (e.g., "fisheye") lenses, 360-degree lenses, zooming lenses, etc.

The method 500 may also include receiving, via at least one of the one or more processors 326 or the one or more transceivers, the one or more images of the at least the portion of the vehicle 124 captured by the imaging unit 352 of the inspection device 350, such as via wireless communication or data transmission over one or more radio frequency links or digital communication channels (block 504). Additionally or alternatively, the one or more images may be received via a transfer of physical medium (e.g., a USB drive).

The method 500 may also include analyzing, via the one or more processors 326, the one or more images based upon data indicative of at least one of vehicle damage or a vehicle defect being shown in the one or more images (block 506). In one aspect, the data indicative of the vehicle damage and/or the vehicle defect being shown in the one or more images may include data indicative of one or more image characteristics that correspond to a presence of damage and/or a defect(s); image data representative of other (e.g., previously captured) images showing vehicle damage and/or a vehicle defect(s); and/or any other suitable data.

In some aspects, analyzing the one or more images may include comparing, via the one or more processors 326, the one or more images to one or more reference images of at least one of vehicle damages or vehicle defects of one or more reference vehicles. Analyzing the one or more images may further include determining, via the one or more processors 326, a similarity between at least one of the one or more images and at least one of the one or more reference images. Identification of the at least one of the damage to the vehicle 124 or the defect of the vehicle 124 may be based upon at least one of a known damage or a known defect of one of the one or more reference vehicles depicted in the at least one of the one or more reference images.

The method 500 may also include identifying, via the one or more processors 326, the at least one of the damage to the vehicle 124 or the defect of the vehicle 124 based upon the analyzing of the one or more images (block 508).

In some aspects, the identified at least one of the damage or the defect may include at least one of a damaged vehicle part or a defective vehicle part. In these aspects, the method 500 may further include scheduling, via the one or more processors 326, at least one of a maintenance, a repair, or a replacement of the at least one of the damaged vehicle part or the defective vehicle part. The method 500 may further include identifying, via the one or more processors 326, a replacement part for replacing the at least one of the damaged vehicle part or the defective vehicle part. The method 500 may further include initiating, via the one or more processors 326, an order of the replacement part for replacing the at least one of the damaged vehicle part or the defective vehicle part.

Additionally or alternatively, in some aspects, the identified at least one of the damage or the defect may include an improper wheel alignment. In these aspects, the method 500 may further include scheduling, via the one or more processors 326, a maintenance for correcting the improper wheel alignment.

In some aspects, the identified damage to the vehicle or defect of the vehicle may be utilized for insurance purposes. For instance, the method 500 may further include generating, via the one or more processors, one or more terms of an insurance policy (e.g., an insurance policy of an owner or driver of the vehicle) based upon the identified at least one of the damage or the defect. Additionally or alternatively, the method 500 may include modifying, via the one or more processors, based upon the identified at least one of the damage or the defect, an insurance policy of a party (e.g., an owner or driver) associated with the vehicle 124. Generated or modified terms of an insurance policy may include a premium, a coverage limit, and/or a deductible, for instance. The insurance policy may be an automotive insurance policy or another type of insurance policy (e.g., home, life, renters, etc.)

Further, in some aspects, the method 500 may include estimating, via the one or more processors 326, a monetary cost of at least one of a maintenance, a service, or a repair for correcting the identified at least one of the damage or the defect.

Furthermore, in some aspects, the method 500 may include transmitting, via at least one of the one or more processors 326 or the one or more transceivers, to at least one of a mobile device (e.g., the mobile device 380) of an owner and/or driver of the vehicle 124 or a mobile device of an insurance representative (e.g., an agent, underwriter, estimator, etc.), an indication of the identified at least one of the damage or the defect. The indication of the identified damage and/or defect may include at least one of a textual explanation of the identified at least one of the damage or the defect, one or more images of the identified damage and/or defect, an estimated monetary cost for correcting the identified damage and/or defect, or an estimated time frame for correcting the identified damage and/or defect. The mobile device may be, for example, a smartphone, PDA, smart wearable device, etc., and the indication may be presented at the mobile device in the form of a text message, a push notification, a web page, a voice message, and/or another suitable mode.

Exemplary Detecting of Insurance Buildup or Fraud

In some aspects, a remotely-controlled and/or autonomously operated inspection device (e.g., the inspection device 350) may be utilized to detect insurance buildup or fraud. Generally, one or more remotely-controlled and/or autonomously operated inspection devices 350 may capture one or more images of a vehicle (e.g., the vehicle 124) for which an insurance claim (e.g., an automotive insurance claim of a damage or defect associated with the vehicle 124) has been made, and analysis of the one or more captured images may result in a determination of whether the insurance claim matches an identified damage to the vehicle 124 or defect of the vehicle 124. If the claimed damage and/or defect generally matches the damage and/or defect identified from the one of more images, the claim may be verified and processed. If the claimed damage and/or defect does not match the identified damage and/or defect (for example, if the claimed damage and/or defect is not identified, or the claimed damage and/or defect exceeds the identified damage and/or defect), it may be determined that a claimant (e.g., an owner of an insurance policy and/or the vehicle) committed insurance buildup or fraud. Additionally or alternatively, it may be determined that an automotive repair, maintenance, or service shop committed fraud or buildup in identifying the damage and/or defect of the vehicle 124.

Figure 6:
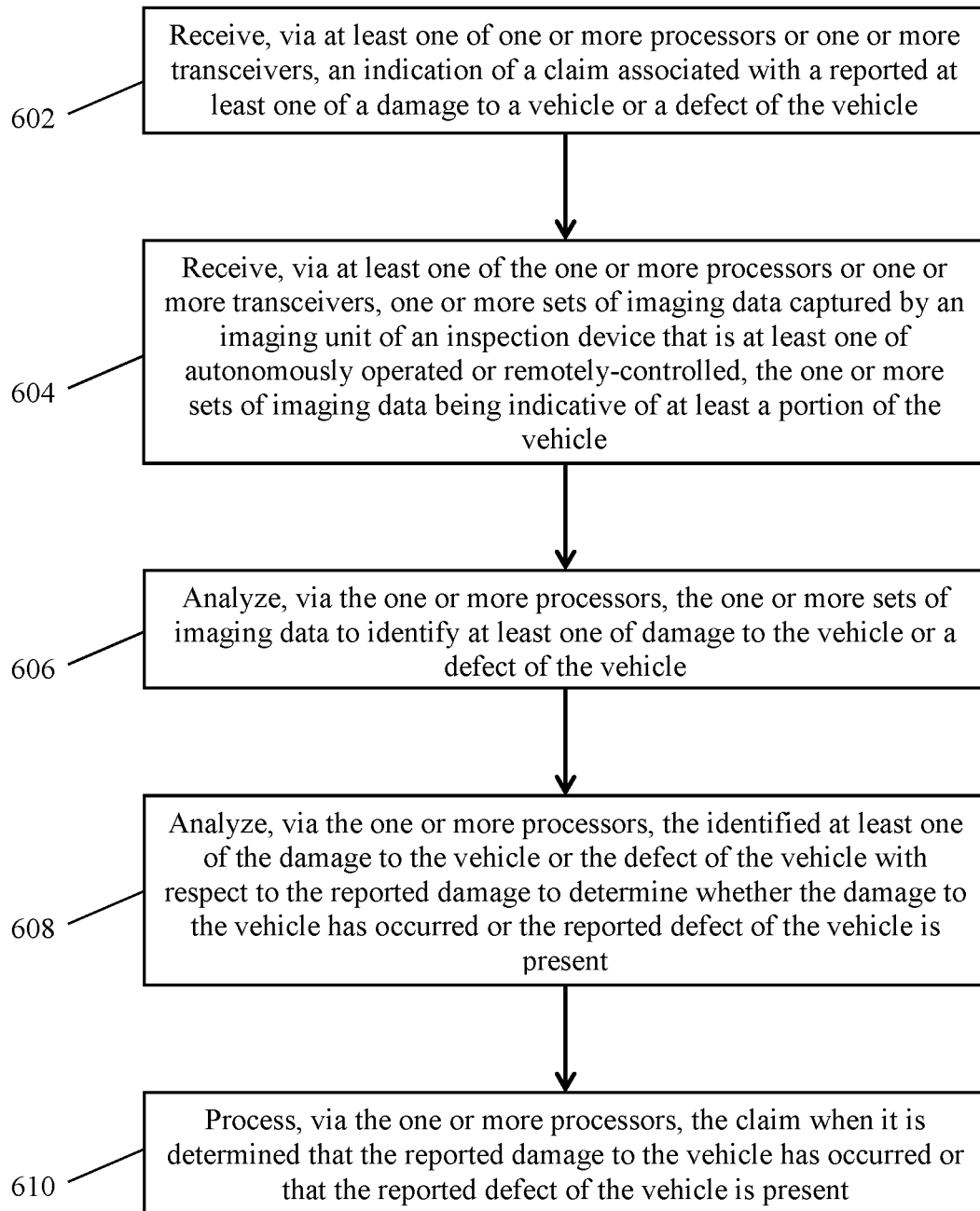
FIG. 6 illustrates a flow diagram of an exemplary computer-implemented method for verifying a vehicle insurance claim in accordance with an exemplary aspect of the present disclosure.

FIG. 6 illustrates a flow diagram of an exemplary computer-implemented method 600 for verifying a claim (e.g., a vehicle insurance claim as described herein, though other claims are possible). The method 600 may be implemented by the system 300 depicted in FIG. 3 or another suitable system. The method 600 may include additional, less, or alternate actions, including actions discussed elsewhere herein.

The method 600 may include receiving, via at least one of one or more processors (e.g., the one or more processors 326) or one or more transceivers (such as via wireless communication or data transmission over one or more radio frequency links or digital communication channels), an indication of a vehicle insurance claim associated with a reported at least one of a damage to a vehicle (e.g., the vehicle 124) or a defect of the vehicle 124 (block 602). The vehicle insurance claim may be made, for instance, by an owner of the vehicle 124, a driver of the vehicle 124, or an insurance representative (e.g., an automotive insurance agent) operating on behalf of the owner and/or driver. The indication of the claim may be received over a computer communication network (e.g., the one or more networks 370) using known technologies and protocols.

The method 600 may also include receiving, via at least one of the one or more processors 326 or one or more transceivers (such as via wireless communication or data transmission over one or more radio frequency links or digital communication channels), one or more sets of imaging data (also referred to herein as "images") captured by an imaging unit (e.g., the imaging unit 352) of an inspection device (e.g., the inspection device 350) that is at least one of autonomously operated or remotely-controlled, the one or more images being of at least a portion of the vehicle 124 (block 604). Additionally or alternatively, the one or more images may be received via a physical medium (e.g., a USB drive). Receiving the one or more images may occur, for instance, in response to receiving the indication of the insurance claim.

The inspection device may be, for example, a ground inspection device (e.g., the ground inspection device 350a) that is at least one of autonomously operated or remotely-controlled. Alternatively, the inspection device may be an airborne inspection device (e.g., the airborne inspection device 350b) that is at least one of autonomously operated or remotely-controlled. Further, multiple inspection devices 350 may be utilized to capture the one or more images, and the multiple inspection devices 350 may be a combination of ground and airborne inspection devices.

The imaging unit 352 of the inspection device 350 may include a photographic camera, a video camera, a lidar imaging unit, a thermal imaging unit, a sonar imaging unit, a radar imaging unit, etc. Accordingly, the one or more images captured by the imaging unit 352 of the inspection device 250 may include still photographs, video, or a suitable combination of the two. Further, the one or more images may include photographic images, lidar images, thermal images, radar images, sonar images, or a suitable combination of the above. Further, the imaging unit 352 may utilize specialty lenses such as wide-angle (e.g., "fisheye") lenses, 360-degree lenses, zooming lenses, etc.

In some aspects, the inspection device 350 may operate according to the received insurance claim. For instance, if the received insurance claim describes damage only to the front bumper of the vehicle, the inspection device 350 may be controlled or autonomously operated to capture one or more images only of portions of the front bumper and surrounding portions of the vehicle 124. However, the inspection device 350 may additionally capture one or more images of parts of other parts of the vehicle 124 not described in the insurance claim, in order to ensure, for example, that all damages to the vehicle 124 or defects of the vehicle 124 may be identified and corrected. In other aspects, however, the inspection device 350 may capture one or more images of the vehicle 124 before an insurance claim is received.

The method 600 may also include analyzing, via the one or more processors 326, the one or more images to identify at least one of damage to the vehicle 124 or a defect of the vehicle 124 (block 606).

In some aspects, analyzing the one or more images may include comparing, via the one or more processors 326, the one or more images to one or more reference images of at least one of vehicle damages or vehicle defects of one or more reference vehicles. Analyzing the one or more images may further include determining, via the one or more processors 326, a similarity between at least one of the one or more images and at least one of the one or more reference images. Identification of the at least one of the damage to the vehicle 124 or the defect of the vehicle 124 may be based upon at least one of a known damage or a known defect of one of the one or more reference vehicles depicted in the at least one of the one or more reference images.

The method 600 may also include analyzing, via the one or more processors 326, the identified at least one of the damage to the vehicle or the defect of the vehicle with respect to the reported damage to determine whether the damage to the vehicle has occurred or the reported defect of the vehicle is present (block 608). Effective, the result of this action may include a determination of one or more of (1) that the identified damage or defect generally aligns with the reported damage or defect, indicating a legitimate insurance claim, (2) that the reported damage or defect exceeds the identified damage or defect (in number of damages/defects and/or in severity of damages/defects), suggesting some degree of buildup or fraud by the claimant in the insurance claim, and/or (3) that the reported damage or defect substantially fails to align with the identified damage or defect, indicating substantial fraud present in the insurance claim.

The method 600 may also include processing, via the one or more processors 326, the insurance claim when it is determined that the reported damage to the vehicle 124 has occurred or that the reported defect of the vehicle 124 is present (block 610). Processing the insurance claim may include issuing a replacement vehicle, issuing a monetary compensation to an owner of the automotive insurance policy associated with the insurance claim, etc.

In some aspects, the identified at least one of the damage or the defect may include at least one of a damaged vehicle part or a defective vehicle part. In these aspects, the method 600 may further include scheduling, via the one or more processors 326, at least one of a maintenance, a repair, or a replacement of the at least one of the damaged vehicle part or the defective vehicle part. The method 600 may further include identifying, via the one or more processors 326, a replacement part for replacing the at least one of the damaged vehicle part or the defective vehicle part. The method 600 may further include initiating, via the one or more processors 326, an order of the replacement part for replacing the at least one of the damaged vehicle part or the defective vehicle part.

Additionally or alternatively, in some aspects, the identified at least one of the damage or the defect may include an improper wheel alignment. In these aspects, the method 600 may further include scheduling, via the one or more processors 326, a maintenance for correcting the improper wheel alignment.

In some aspects, the identified damage to the vehicle or defect of the vehicle may be utilized to generate and/or modify terms of an insurance policy. For instance, the method 600 may further include generating, via the one or more processors 326, one or more terms of an insurance policy (e.g., an insurance policy of an owner or driver of the vehicle) based upon the identified at least one of the damage or the defect. Additionally or alternatively, the method 600 may include modifying, via the one or more processors 326, based upon the identified at least one of the damage or the defect, an insurance policy of a party (e.g., an owner or driver) associated with the vehicle 124. Generated or modified terms of an insurance policy may include a premium, a coverage limit, and/or a deductible, for instance. The insurance policy may be an automotive insurance policy or another type of insurance policy (e.g., home, life, renters, etc.). The generated terms of the insurance policy and/or the modification of the insurance policy may further be based upon the determined veracity of the insurance claim.

Further, in some aspects, the method 600 may include estimating, via the one or more processors 326, a monetary cost of at least one of a maintenance, a service, or a repair for correcting the identified at least one of the damage or the defect.

Furthermore, in some aspects, the method 600 may include transmitting, via at least one of the one or more processors 326 or the one or more transceivers, to at least one of a mobile device (e.g., the mobile device 380) of an owner of the vehicle 124 and/or driver of the vehicle 124 or a mobile device of an insurance representative (e.g., an agent, underwriter, estimator, etc.), an indication of the identified at least one of the damage or the defect. The indication of the identified damage and/or defect may include at least one of a textual explanation of the identified at least one of the damage or the defect, one or more images of the identified damage and/or defect, an estimated monetary cost for correcting the identified damage and/or defect, or an estimated time frame for correcting the identified damage and/or defect. The mobile device may be, for example, a smartphone, PDA, smart wearable device, etc., and the indication may be presented at the mobile device in the form of a text message, a push notification, a web page, a voice message, and/or another suitable mode.

Exemplary Use of Machine Learning in Identifying Vehicle Damage and/or Defects

The present aspects may also employ cognitive computing and/or predictive modeling techniques, including machine learning techniques or algorithms. For instance, training sets of imaging data (also referred to herein as "images") indicative of at least portions of reference vehicles may be input into machine learning programs which may be trained to identify damages and/or defects in vehicles. Systems may utilize these trained programs to (i) identify and/or schedule maintenances, repairs, part replacements and/or services for correcting damages and/or defects, (ii) identify replacement parts for correcting vehicle damages and/or defects, (iii) generating or modifying insurance policies and terms therein, (iv) estimate monetary costs and/or time requirements for correcting vehicle damages and/or defects, and/or (v) transmit indications of vehicle damages and/or defects to mobile devices.

In certain aspects, the cognitive computing and/or predictive modeling techniques discussed herein may include heuristic engines or algorithms, machine learning, cognitive learning, deep learning, combined learning, and/or pattern recognition techniques. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing images of damages of vehicles and/or defects of vehicles in order to facilitate making predictions for subsequent images of subsequent vehicles. Models may be created based upon example inputs in order to make valid and reliable predictions for novel inputs.

Additionally or alternatively, the machine learning programs may be trained by inputting sample images of vehicle damages and/or defects into the programs. The machine learning programs may utilize deep learning algorithms that may be primarily focused on pattern recognition, and/or may be trained after processing multiple examples. The machine learning programs may include Bayesian program learning (BPL), pattern recognition and synthesis, image or object recognition, optical character recognition, and/or natural language processing—either individually or in combination. The machine learning programs may also include natural language processing, semantic analysis, and/or automatic reasoning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one aspect, machine learning techniques may be used to identify damage to a vehicle or a defect of a vehicle based upon one or more images of at least a portion of the vehicle, the one or more images captured by an imaging unit of an inspection device (e.g., a grounded or aerial, remotely-controlled and/or autonomously operated device).

In one aspect, a processing element (and/or heuristic engine or algorithm discussed herein) may be trained by providing it with a large sample of reference images of at least a portion of known reference vehicles, the known reference vehicles having known damages and/or defects.

Based upon these analyses, the processing element may learn how to identify characteristics and patterns that may then be applied to analyzing one or more images of a current vehicle (also referred to herein as a "present vehicle") to identify one or more damages and/or one of more defects of the present vehicle.

Figure 7:
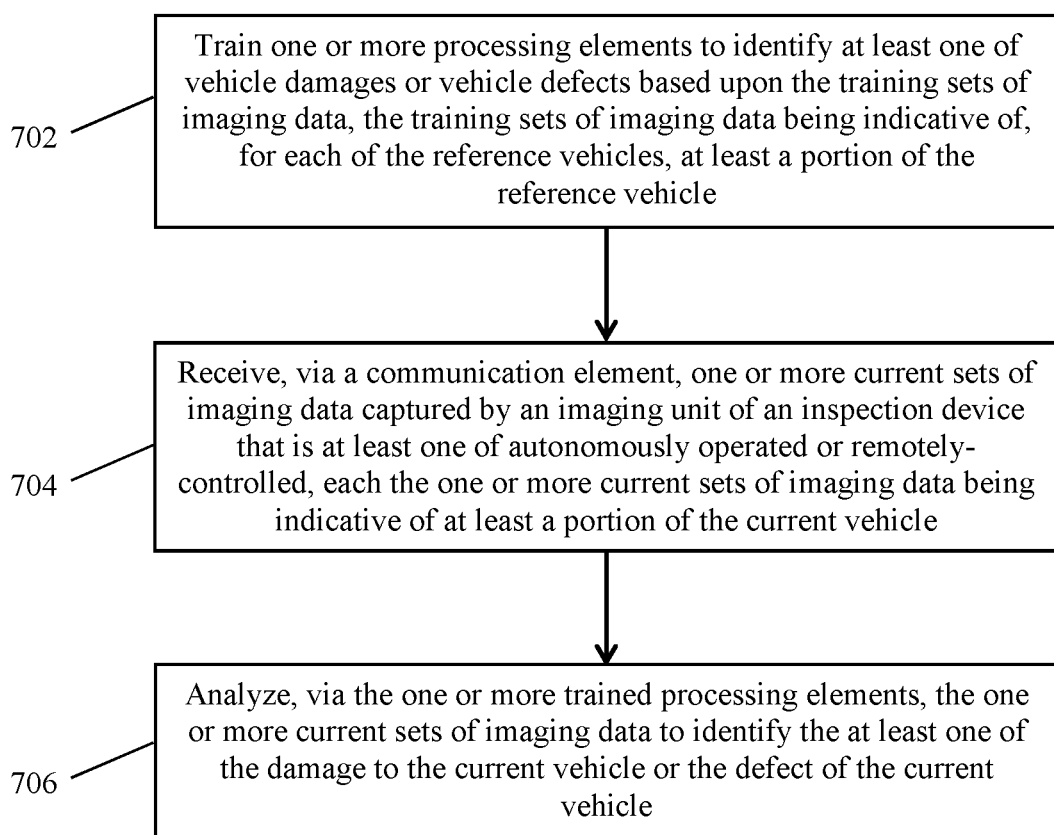
FIG. 7 illustrates a flow diagram of an exemplary computer-implemented method for identifying at least one of damage to a present vehicle or a defect of the present vehicle damage based upon training sets of imaging data indicative of reference vehicles in accordance with an exemplary aspect of the present disclosure.

FIG. 7 depicts an exemplary computer-implemented method 700 for identifying at least one of damage to a present vehicle (e.g., the vehicle 124) or a defect of the present vehicle 124 based upon training images indicative of reference vehicles. The method 700 may be implemented by the system 300 depicted in FIG. 3 or another suitable system. The method 700 may include additional, less, or alternate actions, including actions discussed elsewhere herein.

The method 700 may include training one or more processing elements (e.g., the one or more processors 326) to identify at least one of vehicle damages or vehicle defects based upon the training images, the training images being images of, for each of the reference vehicles, at least a portion of the reference vehicle (block 702). The training images may be captured by a remotely-controlled and/or autonomously operating inspection device (e.g., the inspection device 350). Additionally or alternatively, the training images may be captured in another suitable manner. The training images may include still photographs, video, or some combination of the two. Further, the training images may include photographic images, lidar images, thermal images, radar images, sonar images, or a suitable combination of the above.

The method 700 may also include receiving, via a communication element (e.g., the one or more network interfaces 360 and/or the one or more networks 370, and via wireless communication or data transmission over one or more radio frequency links or digital communication channels), one or more present images captured by an imaging unit (e.g., the imaging unit 352) of the inspection device 350 that is at least one of autonomously operated or remotely-controlled, each of the one or more present images being of at least a portion of the present vehicle 124 (block 704). Additionally or alternatively, the one or more present images may be received via a physical medium (e.g., a USB drive).

The inspection device 350 may be, for example, a ground inspection device (e.g., the ground inspection device 350a) that is at least one of autonomously operated or remotely-controlled. Alternatively, the inspection device 350 may be an airborne inspection device (e.g., the airborne inspection device 350b) that is at least one of autonomously operated or remotely-controlled. Further, multiple inspection devices 350 may be utilized to capture the one or more images, and the multiple inspection devices 350 may be a combination of ground and airborne inspection devices.

The imaging unit 352 of the inspection device 350 may include a photographic camera, a video camera, a lidar imaging unit, a thermal imaging unit, a sonar imaging unit, a radar imaging unit, etc. Accordingly, the one or more images captured by the imaging unit 352 of the inspection device 350 may include still photographs, video, or a suitable combination of the two. Further, the one or more images may include photographic images, lidar images, thermal images, radar images, sonar images, or a suitable combination of the above. Further, the imaging unit 352 may utilize specialty lenses such as wide-angle (e.g., "fisheye") lenses, 360-degree lenses, zooming lenses, etc.

The method 700 may also include analyzing, via the one or more trained processing elements 326, the one or more present images to identify the at least one of the damage to the present vehicle 124 or the defect of the present vehicle 124 (block 706).

In some aspects, the identified at least one of the damage or the defect may include at least one of a damaged vehicle part or a defective vehicle part. In these aspects, the method 700 may further include scheduling, via the one or more processing elements 326, at least one of a maintenance, a repair, or a replacement of the at least one of the damaged vehicle part or the defective vehicle part. The method 700 may further include identifying, via the one or more processing elements 326, a replacement part for replacing the at least one of the damaged vehicle part or the defective vehicle part. The method 700 may further include initiating, via the one or more processing elements 326, an order of the replacement part for replacing the at least one of the damaged vehicle part or the defective vehicle part.

Additionally or alternatively, in some aspects, the identified at least one of the damage or the defect may include an improper wheel alignment. In these aspects, the method 700 may further include scheduling, via the one or more processing elements 326, a maintenance for correcting the improper wheel alignment.

In some aspects, the identified damage to the vehicle 124 or defect of the vehicle 124 may be utilized for insurance purposes. For instance, the method 700 may further include generating, via the one or more processing elements 326, one or more terms of an insurance policy (e.g., an insurance policy of an owner or driver of the vehicle 124) based upon the identified at least one of the damage or the defect. Additionally or alternatively, the method 700 may include modifying, via the one or more processing elements 326, based upon the identified at least one of the damage or the defect, an insurance policy of a party (e.g., an owner or driver) associated with the vehicle 124. Generated or modified terms of an insurance policy may include a premium, a coverage limit, and/or a deductible, for instance. The insurance policy may be an automotive insurance policy or another type of insurance policy (e.g., home, life, renters, etc.).

Further, in some aspects, the method 700 may include estimating, via the one or more processing elements 326, a monetary cost of at least one of a maintenance, a service, or a repair for correcting the identified at least one of the damage or the defect.

Furthermore, in some aspects, the method 700 may include transmitting, via at least one of the one or more processing elements 326 or the communication element 370 and/or 360, to at least one of a mobile device (e.g., the mobile device 380) of an owner and/or driver of the present vehicle 124 or a mobile device of an insurance representative (e.g., an agent, underwriter, estimator, etc.), an indication of the identified at least one of the damage or the defect. The indication of the identified damage and/or defect may include at least one of a textual explanation of the identified at least one of the damage or the defect, one or more images of the identified damage and/or defect, an estimated monetary cost for correcting the identified damage and/or defect, or an estimated time frame for correcting the identified damage and/or defect. The mobile device may be, for example, a smartphone, PDA, smart wearable device, etc., and the indication may be presented at the mobile device in the form of a text message, a push notification, a web page, a voice message, and/or another suitable mode.

Exemplary Computer System Configured to Identify Damage to A Vehicle or a Defect of the Vehicle As depicted by, and discussed in relation to, FIGS. 1-7, for example, in one aspect, a computer system configured to use identify at least one of damage to a vehicle or a defect of the vehicle may be provided. The computer system may include at least one of one or more processors or one or more associated transceivers. The at least one of the one or more processors and/or the one or more associated transceivers may be configured to: (1) cause one or more sets of imaging data (also referred to herein as "images") indicative of at least a portion of the vehicle to be captured by an imaging unit of an inspection device, wherein the inspection device is at least one of autonomously operated or remotely-controlled; (2) receive the one or more images of the at least the portion of the vehicle captured by the imaging unit of the inspection device (such as via wireless communication or data transmission over one or more radio frequency links or digital communication channels); (3) analyze the one or more images based upon data indicative of at least one of vehicle damage or a vehicle defect being shown in the one or more images; and/or (4) identify the at least one of the damage to the vehicle or the defect of the vehicle based upon the analyzing of the one or more images. The computer system may perform additional, fewer, or alternate actions, including actions described in this detailed description.

To analyze the one or more images, the at least one of the one or more processors and/or the one or more associated transceivers may be configured to (1) compare the one or more images to one or more reference images of at least one of vehicle damages or vehicle defects of one or more reference vehicles; and/or (2) determine, via the one or more processors, a similarity between at least one of the one or more images and at least one of the one or more reference images, wherein identifying the at least one of the damage to the vehicle or the defect of the vehicle includes identifying the at least one of the damage to the vehicle or the defect of the vehicle based upon at least one of a known damage or a known defect of one of the one or more reference vehicles depicted in the at least one of the one or more reference images.

Additionally or alternatively, if the identified at least one of the damage or the defect includes at least one of a damaged vehicle part or a defective vehicle part, the at least one of the one or more processors and/or the one or more associated transceivers may be configured to (1) schedule at least one of a maintenance, a repair, or a replacement of the at least one of the damaged vehicle part or the defective vehicle part; (2) identify a replacement part for replacing the at least one of the damaged vehicle part or the defective vehicle part; and/or (3) initiate an order of the replacement part for replacing the at least one of the damaged vehicle part or the defective vehicle part.

Additionally or alternatively, if the identified at least one of the damage or the defect includes an improper wheel alignment, the at least one of the one or more processors and/or the one or more associated transceivers may be configured to schedule a maintenance for correcting the improper wheel alignment.

Additionally or alternatively, the at least one of the one or more processors and/or the one or more associated transceivers may be configured to (1) generate one or more terms of an insurance policy (e.g., a premium, coverage limit, deductible, etc.) based upon the identified at least one of the damage or the defect; and/or (2) modify, based upon the identified at least one of the damage or the defect, an insurance policy of a party associated with the vehicle.

Additionally or alternatively, the at least one of the one or more processors and/or the one or more associated transceivers may be configured to estimate a monetary cost of at least one of a maintenance, a service, or a repair for correcting the identified at least one of the damage or the defect.

Additionally or alternatively, the at least one of the one or more processors and/or the one or more associated transceivers may be configured to transmit, to at least one of a mobile device of an owner of the vehicle or a mobile device of an insurance representative, an indication of the identified at least one of the damage or the defect.

Exemplary Computer System Configured to Verify a Vehicle Insurance Claim

As depicted by, and discussed in relation to, FIGS. 1-7, for example, in one aspect, a computer system configured to verify a claim (e.g., a vehicle insurance claim as described herein, though other claims are possible) may be provided. The computer system may include at least one of one or more processors or one or more associated transceivers. The at least one of the one or more processors and/or the one or more associated transceivers may be configured to: (1) receive an indication of an insurance claim associated with a reported at least one of a damage to a vehicle or a defect of the vehicle (such as via wireless communication or data transmission over one or more radio frequency links or digital communication channels); (2) receive one or more sets of imaging data (also referred to herein as "images") captured by an imaging unit of an inspection device that is at least one of autonomously operated or remotely-controlled, the one or more images being of at least a portion of the vehicle (such as via wireless communication or data transmission over one or more radio frequency links or digital communication channels); (3) analyze the one or more images to identify at least one of damage to the vehicle or a defect of the vehicle; (4) analyze the identified at least one of the damage to the vehicle or the defect of the vehicle with respect to the reported damage to determine whether the damage to the vehicle has occurred or the reported defect of the vehicle is present; and/or (5) process the insurance claim when it is determined that the reported damage to the vehicle has occurred or that the reported defect of the vehicle is present. The computer system may perform additional, fewer, or alternate actions, including actions described in this detailed description.

To analyze the one or more images, the at least one of the one or more processors and/or the one or more associated transceivers may be configured to (1) compare the one or more images to one or more reference images of at least one of vehicle damages or vehicle defects of one or more reference vehicles; and/or (2) determine, via the one or more processors, a similarity between at least one of the one or more images and at least one of the one or more reference images, wherein identifying the at least one of the damage to the vehicle or the defect of the vehicle includes identifying the at least one of the damage to the vehicle or the defect of the vehicle based upon at least one of a known damage or a known defect of one of the one or more reference vehicles depicted in the at least one of the one or more reference images.

Additionally or alternatively, if the identified at least one of the damage or the defect includes at least one of a damaged vehicle part or a defective vehicle part, the at least one of the one or more processors and/or the one or more associated transceivers may be configured to (1) schedule at least one of a maintenance, a repair, or a replacement of the at least one of the damaged vehicle part or the defective vehicle part; (2) identify a replacement part for replacing the at least one of the damaged vehicle part or the defective vehicle part; and/or (3) initiate an order of the replacement part for replacing the at least one of the damaged vehicle part or the defective vehicle part.

Additionally or alternatively, if the identified at least one of the damage or the defect includes an improper wheel alignment, the at least one of the one or more processors and/or the one or more associated transceivers may be configured to schedule a maintenance for correcting the improper wheel alignment.

Additionally or alternatively, the at least one of the one or more processors and/or the one or more associated transceivers may be configured to (1) generate one or more terms of an insurance policy (e.g., a premium, coverage limit, deductible, etc.) based upon the identified at least one of the damage or the defect; and/or (2) modify, based upon the identified at least one of the damage or the defect, an insurance policy of a party associated with the vehicle.

Additionally or alternatively, the at least one of the one or more processors and/or the one or more associated transceivers may be configured to estimate a monetary cost of at least one of a maintenance, a service, or a repair for correcting the identified at least one of the damage or the defect.

Additionally or alternatively, the at least one of the one or more processors and/or the one or more associated transceivers may be configured to transmit, to at least one of a mobile device of an owner of the vehicle or a mobile device of an insurance representative, an indication of the identified at least one of the damage or the defect.

Exemplary Computer System Configured to Identify Damage to A Present Vehicle or a Defect of the Present Vehicle As depicted by, and discussed in relation to, FIGS. 1-7, for example, in one aspect, a computer system configured to use identify at least one of damage to a current vehicle (also referred to herein as a "present vehicle") or a defect of the present vehicle may be provided. The computer system may include at least one of one or more processing elements or one or more communication elements. The at least one of the one or more processing elements and/or the one or more communication elements may be configured to: (1) train the one or more processing elements to identify at least one of vehicle damages or vehicle defects based upon the training sets of imaging data (also referred to herein as "images") the training images being images indicative of, for each of the reference vehicles, at least a portion of the reference vehicle; (2) receive one or more present images captured by an imaging unit of an inspection device that is at least one of autonomously operated or remotely-controlled, each the one or more present images being of at least a portion of the present vehicle (such as via wireless communication or data transmission over one or more radio frequency links or digital communication channels); and/or (3) analyze the one or more present images to identify the at least one of the damage to the present vehicle or the defect of the present vehicle. The computer system may perform additional, fewer, or alternate actions, including actions described in this detailed description.

Additionally or alternatively, if the identified at least one of the damage or the defect includes at least one of a damaged vehicle part or a defective vehicle part, the at least one of the one or more processing elements and/or the one or more communication elements may be configured to (1) schedule at least one of a maintenance, a repair, or a replacement of the at least one of the damaged vehicle part or the defective vehicle part; (2) identify a replacement part for replacing the at least one of the damaged vehicle part or the defective vehicle part; and/or (3) initiate an order of the replacement part for replacing the at least one of the damaged vehicle part or the defective vehicle part.

Additionally or alternatively, if the identified at least one of the damage or the defect includes an improper wheel alignment, the at least one of the one or more processing elements and/or the one or more communication elements may be configured to schedule a maintenance for correcting the improper wheel alignment.

Additionally or alternatively, the at least one of the one or more processing elements and/or the one or more communication elements may be configured to (1) generate one or more terms of an insurance policy (e.g., a premium, coverage limit, deductible, etc.) based upon the identified at least one of the damage or the defect; and/or (2) modify, based upon the identified at least one of the damage or the defect, an insurance policy of a party associated with the present vehicle.

Additionally or alternatively, the at least one of the one or more processing elements and/or the one or more communication elements may be configured to estimate a monetary cost of at least one of a maintenance, a service, or a repair for correcting the identified at least one of the damage or the defect.

Additionally or alternatively, the at least one of the one or more processing elements and/or the one or more communication elements may be configured to transmit, to at least one of a mobile device of an owner of the present vehicle or a mobile device of an insurance representative, an indication of the identified at least one of the damage or the defect.

Exemplary Undercarriage Inspections

In one aspect, a computer-implemented method for identifying damage to an undercarriage of a vehicle or a defect to the undercarriage of the vehicle may be provided. The method may include (1) causing, via one or more processors or one or more transceivers, imaging data indicative of at least a portion of an undercarriage of the vehicle to be captured by an imaging unit of an inspection device, wherein the inspection device is autonomously operated or remotely-controlled; (2) receiving, via the one or more processors or the one or more transceivers, the imaging data indicative of the at least the portion of the undercarriage of the vehicle captured by the imaging unit of the inspection device via wireless communication or data transmission over one or more radio links or digital communication channels; (3) analyzing, via the one or more processors, the imaging data based upon data indicative of undercarriage damage or an undercarriage defect being indicated by the imaging data; and/or (4) identifying, via the one or more processors, the undercarriage damage or the undercarriage defect based upon the analyzing of the imaging data to facilitate undercarriage damage identification and repair. The method may include additional, less, or alternate actions, including those discussed elsewhere herein.

In another aspect, a computer system configured to identify undercarriage damage or an undercarriage defect of a vehicle may be provided. The computer system may include one or more processors, servers, sensor, and/or transceivers, and one or more memories storing computer-executable instructions that, when executed by the one or more processors, cause the computer system to: (1) cause, via at least one of the one or more processors or one or more transceivers, one or more sets of imaging data indicative of at least a portion of an undercarriage of the vehicle to be captured by an imaging unit of an inspection device, wherein the inspection device is at least one of autonomously operated or remotely-controlled; (2) receive, via at least one of the one or more processors or the one or more transceivers, the one or more sets of imaging data indicative of the at least the portion of the undercarriage of the vehicle captured by the imaging unit of the inspection device; (3) analyze, via the one or more processors, the one or more sets of imaging data based upon data indicative of at least one of vehicle damage or a vehicle defect being indicated by the one or more sets of imaging data; and/or (4) identify, via the one or more processors, the at least one of the damage to the vehicle or the defect of the vehicle based upon the analyzing of the one or more sets of imaging data. The computer system may include additional, less, or alternate functionality, including that discussed elsewhere herein.

In another aspect, a computer-implemented method for identifying buildup may be provided. The method may include (1) receiving, via at least one of one or more processors or one or more transceivers, an indication of a claim associated with a reported at least one of undercarriage damage to a vehicle or a defect of the undercarriage of the vehicle; (2) receiving, via at least one of the one or more processors or one or more transceivers, one or more sets of imaging data captured by an imaging unit of an inspection device that is at least one of autonomously operated or remotely-controlled, the one or more sets of imaging data being indicative of at least a portion of an undercarriage of the vehicle; (3) analyzing, via the one or more processors, the one or more sets of imaging data to identify at least one of undercarriage damage to the vehicle or a defect of the undercarriage of the vehicle; (4) analyzing, via the one or more processors, the identified at least one of the undercarriage damage to the vehicle or the defect of the undercarriage of the vehicle with respect to the reported undercarriage damage to determine whether the undercarriage damage to the vehicle has occurred or the reported defect of the undercarriage of the vehicle is present; and/or (5) processing, via the one or more processors, the claim when it is determined that the reported undercarriage damage to the vehicle has occurred or that the reported defect of the undercarriage of the vehicle is present. The method may include additional, less, or alternate actions, including those discussed elsewhere herein.

In another aspect, a computer system configured to identify buildup may be provided. The system may include one or more processors, servers, sensors, and/or transceivers; and one or more memories storing computer-executable instructions that, when executed by the one or more processors, cause the computer system to: (1) receive, via at least one of the one or more processors or one or more transceivers, an indication of a claim associated with a reported at least one of undercarriage damage or an undercarriage defect associated with the vehicle; (2) receive, via at least one of the one or more processors or one or more transceivers, one or more sets of imaging data captured by an imaging unit of an inspection device that is at least one of autonomously operated or remotely-controlled, the one or more sets of imaging data being indicative of at least a portion of the undercarriage of the vehicle; (3) analyze, via the one or more processors, the one or more sets of imaging data to identify at least one of undercarriage damage or an undercarriage defect; (4) analyze, via the one or more processors, the identified at least one of the undercarriage damage or the undercarriage defect with respect to the reported damage to determine whether the undercarriage damage has occurred or the reported undercarriage defect is present; and/or (5) process, via the one or more processors, the claim when it is determined that the reported undercarriage damage to the vehicle has occurred or that the reported undercarriage defect is present. The computer system may include additional, less, or alternate functionality, including that discussed elsewhere herein.

In another aspect, a computer-implemented method for identifying at least one of undercarriage damage to a current vehicle or an undercarriage defect of the current vehicle damage based upon training sets of imaging data indicative of reference vehicles may be provided. The method may include (1) training one or more processing elements to identify at least one of undercarriage damages or undercarriage defects based upon the training sets of imaging data, the training sets of imaging data being indicative of, for each of the reference vehicles, at least a portion of an undercarriage of the reference vehicle; (2) receiving, via a communication element (such as via wireless communication or data transmission over one or more radio links or digital communication channels), one or more current sets of imaging data captured by an imaging unit of an inspection device that is at least one of autonomously operated or remotely-controlled, each the one or more current sets of imaging data being indicative of at least a portion of a undercarriage of the current vehicle; and/or (3) analyzing, via the one or more trained processing elements, the one or more current sets of imaging data to identify the at least one of the undercarriage damage to the current vehicle or the undercarriage defect of the current vehicle. The method may include additional, less, or alternate actions, including those discussed elsewhere herein.

In another aspect, a computer system configured to identify at least one of undercarriage damage to a current vehicle or an undercarriage defect of the current vehicle based upon training sets of imaging data indicative of reference vehicles may be provided. The computer system may include one or more processing elements; and one or more memories comprising computer-executable instructions that, when executed by the one or more processing elements, cause the computer system to (1) train the one or more processing elements to identify at least one of undercarriage damages or undercarriage defects based upon the training sets of imaging data, the training sets of imaging data being indicative of, for each of the reference vehicles, at least a portion of the undercarriage of the reference vehicle; (2) receive, via a communication element, one or more current sets of imaging data captured by an imaging unit of an inspection device that is at least one of autonomously operated or remotely-controlled, each the one or more current sets of imaging data being indicative of at least a portion of an undercarriage of the current vehicle; and/or (3) analyze, via the one or more trained processing elements, the one or more current sets of imaging data to identify the at least one of the undercarriage damage to the current vehicle or an undercarriage defect of the current vehicle to facilitate identification and repair of undercarriage damage. The computer system may include additional, less, or alternate functionality, including that discussed elsewhere herein.

EXEMPLARY EMBODIMENTS

In one aspect, a computer-implemented method for identifying damage to an undercarriage of a vehicle or a defect to the undercarriage of the vehicle may be provided. The method may include (1) causing, via one or more processors or one or more transceivers, imaging data indicative of at least a portion of an undercarriage of the vehicle to be captured by an imaging unit of an inspection device, wherein the inspection device is autonomously operated or remotely-controlled; (2) receiving, via the one or more processors or the one or more transceivers, the imaging data indicative of the at least the portion of the undercarriage of the vehicle captured by the imaging unit of the inspection device via wireless communication or data transmission over one or more radio links or digital communication channels; (3) analyzing, via the one or more processors, the imaging data based upon data indicative of undercarriage damage or an undercarriage defect being indicated by the imaging data; and/or (4) identifying, via the one or more processors, the undercarriage damage or the undercarriage defect based upon the analyzing of the imaging data to facilitate undercarriage damage identification and repair. The method may include additional, less, or alternate actions, including those discussed elsewhere herein.

For instance, the inspection device may be a ground inspection device or rover that is either autonomously operated or remotely-controlled, or both. Alternatively, the inspection device may be an airborne inspection device that is either autonomously operated or remotely-controlled, or both.

The identified undercarriage damage or undercarriage defect may include damage to the vehicles' drivetrain, wheels, axle, and/or exhaust system. The method may include identifying, via the one or more processors, a damaged or defective undercarriage part associated with the identified undercarriage damage or undercarriage defect; and scheduling, via the one or more processors, at least one of a maintenance, a repair, or a replacement of the damaged or defective undercarriage part.

The method may include identifying, via the one or more processors, a replacement part for replacing the damaged or the defective undercarriage part. The method may include initiating, via the one or more processors, an order of the replacement part for replacing the damaged or defective undercarriage part. The identified undercarriage damage or undercarriage defect may include an improper wheel alignment.

The method may include scheduling, via the one or more processors, a maintenance for correcting the improper wheel alignment. The imaging data may include one or more sets of thermal imaging data. The imaging data may include one or more sets of lidar imaging data. Additionally or alternatively, the imaging data may include one or more sets of imaging data captured using a wide-angle camera lens of the imaging unit.

The method may include generating or adjusting, via the one or more processors, one or more terms of an insurance policy based upon the identified undercarriage damage or undercarriage defect. The method may include modifying, via the one or more processors, based upon the identified undercarriage damage or undercarriage defect, an insurance policy of a party associated with the vehicle or covering the vehicle. Modifying the insurance policy may include modifying at least one of a premium, a type of coverage, a coverage limit, discount, or a deductible. Warranties may also be adjusted.

The method may include estimating, via the one or more processors, a monetary cost of at least one of a maintenance, a service, or a repair for correcting the identified undercarriage damage or undercarriage defect. The method may include transmitting, via the one or more processors or the one or more transceivers, to at least one of a mobile device of an owner of the vehicle or a mobile device of an insurance representative, an indication of the identified undercarriage damage or undercarriage defect via wireless communication or data transmission over one or more radio frequency links or digital communication channels.

Analyzing the imaging data may include (i) comparing, via the one or more processors, the imaging data to one or more reference sets of imaging data indicative of at least one of undercarriage damages or undercarriage defects of one or more reference vehicles; and (ii) determining, via the one or more processors, a similarity between the imaging data and at least one of the one or more reference sets of imaging data, wherein identifying the undercarriage damage or defect includes identifying the undercarriage damage or defect based upon at least one of a known damage or a known defect of one of the one or more reference vehicles indicated by the at least one of the one or more reference sets of imaging data.

In another aspect, a computer-implemented method may include (1) receiving, via at least one of one or more processors or one or more transceivers, an indication of a claim associated with a reported at least one of undercarriage damage to a vehicle or a defect of the undercarriage of the vehicle; (2) analyzing, via the one or more processors, the one or more sets of imaging data to identify at least one of undercarriage damage to the vehicle or a defect of the undercarriage of the vehicle; (3) analyzing, via the one or more processors, the identified at least one of the undercarriage damage to the vehicle or the defect of the undercarriage of the vehicle with respect to the reported undercarriage damage to determine whether the undercarriage damage to the vehicle has occurred or the reported defect of the undercarriage of the vehicle is present; and/or (4) processing, via the one or more processors, the claim when it is determined that the reported undercarriage damage to the vehicle has occurred or that the reported defect of the undercarriage of the vehicle is present. The method may include additional, less, or alternate actions, including those discussed elsewhere herein and directly above.

In another aspect, a computer system configured to identify undercarriage damage or an undercarriage defect of a vehicle may be provided. The computer system may include one or more processors, and one or more memories storing computer-executable instructions that, when executed by the one or more processors, cause the computer system to: (1) cause, via at least one of the one or more processors or one or more transceivers, one or more sets of imaging data indicative of at least a portion of an undercarriage of the vehicle to be captured by an imaging unit of an inspection device, wherein the inspection device is at least one of autonomously operated or remotely-controlled; (2) receive, via at least one of the one or more processors or the one or more transceivers, the one or more sets of imaging data indicative of the at least the portion of the undercarriage of the vehicle captured by the imaging unit of the inspection device; (3) analyze, via the one or more processors, the one or more sets of imaging data based upon data indicative of at least one of vehicle damage or a vehicle defect being indicated by the one or more sets of imaging data; and/or (4) identify, via the one or more processors, the at least one of the damage to the vehicle or the defect of the vehicle based upon the analyzing of the one or more sets of imaging data. The computer system may include additional, less, or alternate functionality, including that discussed elsewhere herein, such as that included within the computer-implemented methods detailed above.

In another aspect, a computer system may include one or more processors; and one or more memories storing computer-executable instructions that, when executed by the one or more processors, cause the computer system to: (1)

receive, via at least one of the one or more processors or one or more transceivers, an indication of a claim associated with a reported at least one of undercarriage damage or an undercarriage defect associated with the vehicle; (2) receive, via at least one of the one or more processors or one or more transceivers, one or more sets of imaging data captured by an imaging unit of an inspection device that is at least one of autonomously operated or remotely-controlled, the one or more sets of imaging data being indicative of at least a portion of the undercarriage of the vehicle; (3) analyze, via the one or more processors, the one or more sets of imaging data to identify at least one of undercarriage damage or an undercarriage defect; (4) analyze, via the one or more processors, the identified at least one of the undercarriage damage or the undercarriage defect with respect to the reported damage to determine whether the undercarriage damage has occurred or the reported undercarriage defect is present; and/or (5) process, via the one or more processors, the claim when it is determined that the reported undercarriage damage to the vehicle has occurred or that the reported undercarriage defect is present. The computer system may include additional, less, or alternate functionality, including that discussed elsewhere herein.

ADDITIONAL CONSIDERATIONS

Although the text herein sets forth a detailed description of numerous different aspects, it should be understood that the legal scope of the invention is defined by the words of the claims set forth at the end of this patent. The detailed description is to be construed as exemplary only and does not describe every possible aspect, as describing every possible aspect would be impractical, if not impossible. One could implement numerous alternate aspects, using either current technology or technology developed after the filing date of this patent, which would still fall within the scope of the claims.

It should also be understood that, unless a term is expressly defined in this patent using the sentence "As used herein, the term '____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example aspects, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various aspects, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering aspects in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In aspects in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location. In other example aspects, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some aspects may be described using the expression "coupled" and "connected" along with their derivatives. For example, some aspects may be described using the term "coupled" to indicate that two or more elements are in direct physical or electrical contact. The term "coupled," however, may also mean that two or more elements are not in direct contact with each other, but yet still co-operate or interact with each other. The aspects are not limited in this context.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (i.e., the vehicle) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein any reference to "one aspect" or "an aspect" means that a particular element, feature, structure, or characteristic described in connection with the aspect may be included in at least one aspect. The appearances of the phrase "in one aspect" in various places in the specification are not necessarily all referring to the same aspect. In addition, use of the "a" or "an" are employed to describe elements and components of the aspects herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible aspect, as describing every possible aspect would be impractical, if not impossible. One could implement numerous alternate aspects, using either current technology or technology developed after the filing date of this application. Upon reading this disclosure, those of skill in the art will appreciate still additional alternative structural and functional designs for system and a method for identifying damage to a vehicle or a defect of a vehicle through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific aspect may be combined in any suitable manner and in any suitable combination with one or more other aspects, including the use of selected features without corresponding use of other features. In addition, many modifications may be made to adapt a particular application, situation or material to the essential scope and spirit of the present invention. It is to be understood that other variations and modifications of the aspects of the present invention described and illustrated herein are possible in light of the teachings herein and are to be considered part of the spirit and scope of the present invention.

While the preferred aspects of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the claims at the end of this patent, including all equivalents, that are intended to define the spirit and scope of this invention.

What is claimed is:

1. A computer-implemented method comprising:
receiving, via at least one of one or more processors or one or more transceivers, an indication of an insurance claim associated with a reported a damage to a vehicle;
receiving, via at least one of the one or more processors or one or more transceivers, one or more sets of imaging data captured by an imaging unit of an inspection device that is at least one of autonomously operated or remotely-controlled, the one or more sets of imaging data being indicative of at least a portion of the vehicle;

analyzing, via the one or more processors, the one or more sets of imaging data to identify at least one of damage to the vehicle or a defect of the vehicle;

analyzing, via the one or more processors, the identified at least one of the damage to the vehicle or the defect of the vehicle with respect to the reported damage to determine whether the reported damage to the vehicle is accurate;

in response to determining that the reported damage to the vehicle is accurate, processing, via the one or more processors, the insurance claim; and transmitting, via at least one of the one or more processors or the one or more transceivers, to at least one of a mobile device of an owner of the vehicle or a mobile device of an insurance representative, an indication of the identified at least one of the damage or the defect.

2. The computer-implemented method of claim 1, wherein the inspection device is a ground inspection device that is at least one of autonomously operated or remotely-controlled.

3. The computer-implemented method of claim 1, wherein the inspection device is an airborne inspection device that is at least one of autonomously operated or remotely-controlled.

4. The computer-implemented method of claim 1, wherein the identified at least one of the damage or the defect includes at least one of a damaged vehicle part or a defective vehicle part.

5. The computer-implemented method of claim 4, further comprising scheduling, via the one or more processors, at least one of a maintenance, a repair, or a replacement of the at least one of the damaged vehicle part or the defective vehicle part.

6. The computer-implemented method of claim 4, further comprising identifying, via the one or more processors, a replacement part for replacing the at least one of the damaged vehicle part or the defective vehicle part.

7. The computer-implemented method of claim 6, further comprising initiating, via the one or more processors, an order of the replacement part for replacing the at least one of the damaged vehicle part or the defective vehicle part.

8. The computer-implemented method of claim 1, wherein the identified at least one of the damage or the defect includes an improper wheel alignment.

9. The computer-implemented method of claim 8, further comprising scheduling, via the one or more processors, a maintenance for correcting the improper wheel alignment.

10. A computer system comprising:
one or more processors; and
one or more memories storing computer-executable instructions that, when executed by the one or more processors, cause the computer system to:
receive, via at least one of the one or more processors or one or more transceivers, an indication of an insurance claim associated with a reported damage to a vehicle;
receive, via at least one of the one or more processors or one or more transceivers, one or more sets of imaging data captured by an imaging unit of an inspection device that is at least one of autonomously operated or remotely-controlled, the one or more sets of imaging data being indicative of at least a portion of the vehicle;
analyze, via the one or more processors, the one or more sets of imaging data to identify at least one of damage to the vehicle or a defect of the vehicle;
analyze, via the one or more processors, the identified at least one of the damage to the vehicle or the defect of the vehicle with respect to the reported damage to determine whether the reported damage to the vehicle is accurate;
in response to determining that the reported damage to the vehicle is accurate, process, via the one or more processors, the insurance claim; and
transmit, via at least one of the one or more processors or the one or more transceivers, to at least one of a mobile device of an owner of the vehicle or a mobile device of an insurance representative, an indication of the identified at least one of the damage or the defect.

11. The computer system of claim 10, wherein the one or more sets of imaging data include one or more sets of thermal imaging data.

12. The computer system of claim 10, wherein the one or more sets of imaging data include one or more sets of lidar imaging data.

13. The computer system of claim 10, wherein the one or more sets of imaging data include one or more sets of imaging data captured using a wide-angle camera lens of the imaging unit.

14. The computer system of claim 10, wherein the computer system is further configured to generate, via the one or more processors, one or more terms of an insurance policy based upon the identified at least one of the damage or the defect.

15. The computer system of claim 10, wherein the computer system is further configured to modify, via the one or more processors, based upon the identified at least one of the damage or the defect, an insurance policy of a party associated with the vehicle.

16. The computer-implemented method of claim 15, wherein modifying the insurance policy includes modifying at least one of a premium, a coverage limit, or a deductible.

17. The computer system of claim 10, wherein the computer system is further configured to estimate, via the one or more processors, a monetary cost of at least one of a maintenance, a service, or a repair for correcting the identified at least one of the damage or the defect.

18. The computer system of claim 10, wherein, to analyze the one or more sets of imaging data, the computer system is configured to:
compare, via the one or more processors, the one or more sets of imaging data to one or more reference sets of imaging data indicative of at least one of vehicle damages or vehicle defects of one or more reference vehicles;
determine, via the one or more processors, a similarity between at least one of the one or more sets of imaging data and at least one of the one or more reference sets of imaging data,
wherein identifying the at least one of the damage to the vehicle or the defect of the vehicle includes identifying the at least one of the damage to the vehicle or the defect of the vehicle based upon at least one of a known damage or a known defect of one of the one or more reference vehicles indicated by the at least one of the one or more sets of imaging data.

* * * * *